United States Patent

Barris et al.

[11] Patent Number: 5,851,943
[45] Date of Patent: Dec. 22, 1998

[54] CERAMIC PRODUCTION PROCESS

[75] Inventors: Glen Clifton Barris, Wellington; Gregory Michael Hodren, Auckland, both of New Zealand

[73] Assignees: Industrial Research Limited, New Zealand; Pryotek Products Limited, Netherlands

[21] Appl. No.: 750,272

[22] PCT Filed: Jun. 6, 1995

[86] PCT No.: PCT/NZ95/00050

§ 371 Date: Apr. 28, 1997

§ 102(e) Date: Apr. 28, 1997

[87] PCT Pub. No.: WO95/33700

PCT Pub. Date: Dec. 14, 1995

[30] Foreign Application Priority Data

Jun. 3, 1994 [NZ] New Zealand ............ 260686
Jul. 18, 1994 [NZ] New Zealand ............ 264034

[51] Int. Cl.$^6$ .................. C04B 35/599
[52] U.S. Cl. ............ 501/98.1; 501/98.2; 501/98.3; 423/327.1
[58] Field of Search ............ 501/98.1, 98.2, 501/98.3; 423/327.1

[56] References Cited

U.S. PATENT DOCUMENTS

| 4,184,884 | 1/1980 | Jong ............ 264/56 |
| 4,243,621 | 1/1981 | Mori et al. ............ 264/65 |
| 4,360,506 | 11/1982 | Paris et al. ............ 423/327 |
| 4,506,021 | 3/1985 | Jack et al. ............ 501/98 |
| 4,913,408 | 4/1990 | Hoaggard et al. ............ 501/98 |
| 4,935,389 | 6/1990 | Umebayashi et al. ............ 501/98 |
| 5,110,773 | 5/1992 | Corral et al. ............ 501/98.1 |
| 5,411,762 | 5/1995 | Thebault et al. ............ 501/98.1 |
| 5,552,353 | 9/1996 | Kwong ............ 501/98.1 |

FOREIGN PATENT DOCUMENTS

WO 95/07247  3/1995  WIPO .

*Primary Examiner*—Karl Group
*Attorney, Agent, or Firm*—Amy E Mandragouras; Lawrence E Monks; Lahive & Cockfield, LLP

[57] ABSTRACT

A process for the production of O'—SIALON ceramics from silicon metal, nitrogen and clay, the process comprising heating the silicon metal and the clay in a flowing nitrogen atmosphere to a temperature sufficient to react the components to form O'—SIALON and wherein the clay participates in the reaction as a source of aluminum and silicon.

32 Claims, 20 Drawing Sheets

| SAMPLE CODE | HEIGHT OF MOST INTENSE XRD PEAK/MOST INTENSE O'-SiAlON PEAK (COUNTS) | | | | | | ESTIMATED O'-SiAlON YIELD(%)[a] | WEIGHT GAIN(%) | DIMENSIONAL CHANGE(%) |
|---|---|---|---|---|---|---|---|---|---|
| | MULLITE | CRISTOBALITE | α-PHASE | β-PHASE | X-PHASE | O'-SiAlON | | | |
| A | | | 13 | 85 | 5 | 100 | 67 | 31 | -2.0 |
| B | 3 | | | 7 | 2 | 100 | 92 | 24 | -6.0 |
| C | 5 | | | 13 | 6 | 100 | 73 | 19 | -3.5 |
| D | 7 | | | 9 | 5 | 100 | 55 | -3 | -7.8 |
| E | 6 | 28 | | 14 | 8 | 100 | 38 | -5 | -19.1 |
| F | 24 | 465 | | | | 100 | 13 | 0 | -19.4 |
| G | 3 | | 6 | 46 | 11 | 100 | 79 | 16 | -3.8 |
| H | 4 | | 4 | 41 | 18 | 100 | 67 | 25 | -5.7 |
| I | 5 | | | 27 | 21 | 100 | 53 | 16 | -8.5 |
| J | 19 | | 11 | 58 | 37 | 100 | 35 | 4 | -12.0 |
| K | 187 | | | 250 | 183 | 100 | 6 | 8 | -22.9 |
| L | 11 | | | 14 | 11 | 100 | 60 | 7 | -7.5 |
| M | 14 | 10 | | 27 | 19 | 100 | 34 | 2 | -14.7 |
| N | 93 | 179 | | 109 | 76 | 100 | 9 | 6 | -21.0 |

[a] THE ESTIMATED PERCENTAGE YIELD OF O'-SiAlON IS BASED ON THE ABSOLUTE HEIGHT OF THE MAXIMUM INTENSITY O'-SiAlON PEAK.

| ADDITIVE | HEIGHT OF MOST INTENSE XRD PEAK/MOST INTENSE O'-SiAlON PEAK (cnts) | | | | WEIGHT GAIN (%) | DIMENSIONAL CHANGE (%) |
|---|---|---|---|---|---|---|
| | SILICON | MULLITE | β-PHASE | X-PHASE | O'-SiAlON | | |
| NONE | | 6 | 9 | | 100 | 24 | -7.4 |
| Ca | 1355 | 53 | 50 | | 100 | -4 | -18.1 |
| Y | | 2 | 3 | 2 | 100 | 23 | -14.4 |
| Fe | | 41 | 95 | 34 | 100 | 24 | -4.4 |
| Ba | 196 | 13 | 10 | | 100 | 11 | -15.5 |
| Na | 835 | 25 | 9 | | 100 | 3 | -20 |
| Zr | | 2 | 3 | 3 | 100 | 23 | -5 |

| SECOND COMPONENT | HEIGHT OF MOST INTENSE XRD PEAK/MOST INTENSE PEAK FOR O'-SiAlON (%) | | | | | | WEIGHT GAIN(%) | DIMENSIONAL CHANGE(%) |
|---|---|---|---|---|---|---|---|---|
| | MULLITE | α-PHASE | β-PHASE | X-PHASE | O'-SiAlON | $Al_2O_3$ | | |
| NONE | 6 | | 9 | | 100 | | 24 | -7.4 |
| $Al_2O_3$ | 10 | | 50 | 13 | 100 | 254[a] | 7 | -0.6 |
| $Si_3N_4$ | 7 | 307[a] | 33[a] | | 100 | | 9 | |
| β-SiAlON | 5 | | 56[a] | 4 | 100 | 57[a] | 8 | -5.7 |
| $ZrO_2$ | 9 | 8 | | | 100 | | 10 | -3.4 |
| $ZrSiO_4$ | 9 | 6 | 12 | 5 | 100 | | 9 | -4.2 |

[a] PRESENT INITIALLY IN THE SECOND COMPONENT OF THE O'-SiAlON COMPOSITE, AND CARRIED THROUGH TO THE PRODUCT.

*FIG. 15*

| SAMPLE | NZCC HALLOYSITE | BDH KAOLIN |
|---|---|---|
| $Fe_2O_3$ | 0.14 ± 0.00 | 0.39 ± 0.01 |
| MnO | <0.01 | <0.01 |
| $TiO_2$ | 0.09 ± 0.00 | 0.05 ± 0.00 |
| CaO | <0.01 | <0.01 |
| $K_2O$ | 0.05 ± 0.00 | 1.81 ± 0.01 |
| $SO_3$ | ND | ND |
| $P_2O_5$ | 0.11 ± 0.00 | 0.18 ± 0.00 |
| $SiO_2$ | 51.33 ± 0.51 | 46.56 ± 0.20 |
| $Al_2O_3$ | 34.41 ± 0.39 | 37.89 ± 0.07 |
| MgO | <0.04 | 0.12 ± 0.01 |
| $Na_2O$ | <0.09 | 0.15 ± 0.02 |
| LOI | 13.34 ± 0.30 | 13.15 ± 0.09 |
| SUM | 99.46 | 99.30 |

| SAMPLE | PYROPHYLITE | SANDBLEND | GEORGIA KAOLIN | SM/23 BENTONITE |
|---|---|---|---|---|
| $Fe_2O_3$ | 0.31± 0.00 | 1.03± 0.01 | 0.29± 0.00 | 4.68± 0.02 |
| MnO | <0.01 | <0.01 | <0.01 | 0.01± 0.00 |
| $TiO_2$ | 0.20± 0.00 | 1.15± 0.01 | 1.45± 0.01 | 0.26± 0.01 |
| CaO | 0.02± 0.00 | 0.18± 0.00 | 0.03± 0.00 | 1.24± 0.01 |
| $K_2O$ | 2.49± 0.04 | 2.16± 0.04 | 0.11± 0.00 | 0.30± 0.00 |
| $SO_3$ | ND | ND | ND | ND |
| $P_2O_5$ | 0.02± 0.01 | 0.06± 0.00 | 0.04± 0.00 | 0.03± 0.00 |
| $SiO_2$ | 71.55± 0.12 | 52.38± 0.18 | 44.80± 0.08 | 65.30± 0.04 |
| $Al_2O_3$ | 21.47± 0.17 | 29.71± 0.25 | 39.36± 0.09 | 16.51± 0.06 |
| MgO | <0.02 | 0.39± 0.03 | <0.02 | 3.01± 0.14 |
| $Na_2O$ | 0.10± 0.01 | 0.26± 0.01 | <0.04 | 2.16± 0.03 |
| LOI | 3.51± 0.03 | 12.03± 0.00 | 13.76± 0.01 | 5.73± 0.01 |
| SUM | 99.67 | 99.34 | 99.84 | 99.23 |

| SAMPLE> | CERAM BBR | RHEOGEL | ADFLO |
|---|---|---|---|
| $Fe_2O_3$ | 0.80± 0.01 | 11.50± 0.07 | 0.86± 0.00 |
| MnO | <0.01 | 0.06± 0.00 | <0.01 |
| $TiO_2$ | 0.99± 0.01 | 2.41± 0.02 | 1.30± 0.01 |
| CaO | 0.05± 0.01 | 1.29± 0.01 | 0.53± 0.01 |
| $K_2O$ | 0.43± 0.01 | 0.53± 0.01 | 2.17± 0.03 |
| $SO_3$ | ND | ND | ND |
| $P_2O_5$ | 0.04± 0.01 | 0.13± 0.01 | 0.10± 0.01 |
| $SiO_2$ | 52.13± 0.28 | 53.24± 0.20 | 50.12± 0.15 |
| $Al_2O_3$ | 32.44± 0.36 | 17.84± 0.08 | 33.46± 0.13 |
| MgO | 0.40± 0.03 | 2.34± 0.11 | 0.36± 0.02 |
| $Na_2O$ | 0.24± 0.01 | 2.59± 0.05 | <0.04 |
| LOI | 11.55± 0.02 | 7.54± 0.02 | 10.54± 0.00 |
| SUM | 99.05 | 99.46 | 99.43 |

*FIG. 17*

| MINERAL | RATIO OF RAW MATERIALS (%) | | | TARGET SiAlON X-VALUE | HEIGHT OF MOST INTENSE XRD PEAK/MOST INTENSE O'-SiAlON PEAK (COUNTS) | | | | | O'-SiAlON (est % y/d) | WEIGHT GAIN (% OF THEORETICAL) |
| | CLAY | Si | SiO₂ | | SILICON | MULLITE | α-PHASE | β-PHASE | X-PHASE | | |
|---|---|---|---|---|---|---|---|---|---|---|---|
| RHEOGEL CLAY[a] | 55.3 | 44.7 | – | 1.8 | | | 3 | 6 | 2 | 100 (68) | 62 |
| BENLONITE SM123[a] | 50.7 | 49.3 | – | 1.4 | | | | 1 | | 100 (97) | 63 |
| PYROPHYLLITE[c] | 49.0 | 51.0 | – | 1.6 | | | 10 | 22 | | 100 (61) | 49 |
| WBB SANBLEND 75[b] | 39.1 | 49.1 | 11.8 | 2 | | 4 | | 18 | 7 | 100 (84) | -15 |
| CERAM BBR CLAY[a] | 36.4 | 49.7 | 13.9 | 2 | | | | 15 | 7 | 100 (87) | 37 |
| ADFLO Q145 CLAY[b] | 35.4 | 49.3 | 15.3 | 2 | | | | 17 | 5 | 100 (88) | 19 |
| HALLOYSITE CLAY[d] | 32.9 | 50.4 | 16.7 | 2 | | | | 4 | 2 | 100 (95) | 61 |
| BDH LIGHT KAOLIN | 30.8 | 50.0 | 19.1 | 2 | | | | 6 | 3 | 100 (90) | 55 |
| GEORGIA KAOLIN | 29.5 | 50.1 | 20.4 | 2 | | 2 | | 18 | 4 | 100 (91) | 28 |

[a] SUPPLIED BY COMMERCIAL MINERALS (NZ) LTD. [b] SUPPLIED BY MINTECH (NZ) LTD. [c] VANDERBILT PYRAX HS, SEIVED AND ACID WASHED. [d] NEW ZEALAND CHINA CLAYS PREMIUM GRADE HALLOYSITE

FIG. 18

CERAMIC PRODUCTION PROCESS

TECHNICAL FIELD

The invention comprises a process for the production of O'—SiAlON's and composite ceramic materials containing O'—SiAlON's.

BACKGROUND ART

The term SiAlON, or silicon aluminium oxynitride, encompasses a family of compounds or phases comprised of the elements: silicon, aluminium, oxygen and nitrogen. Each phase is described by a composition range for which that particular structure is stable. O'—SiAlON is stable over the composition range: $Si_{2-x}Al_xO_{1+x}N_{2-x}$ where $0<x\leq0.4$. O'—SiAlON has a similar structure to silicon oxynitride with equal amounts of aluminium and oxygen substituting for silicon and nitrogen respectively into the silicon oxynitride structure. The amounts of aluminium and oxygen which can be substituted into the structure increase with temperature. At 1600° C., x can be as high as 0.2. At 1900° C., x can be as high as 0.4.

SiAlON's are advanced ceramic materials which exhibit useful properties such as high strength and hardness, low density, wear resistance and corrosion resistance, and are able to retain these properties at high temperatures. SiAlON's are used in refractories and for a variety of engineering applications such as cutting tools, spray nozzles and pump seals. The exact properties of a given SiAlON depend on the chemical composition and fabrication variables, such as purity, grain size and shape, and the method of fabrication. O'—SiAlON has similar properties to silicon oxynitride which include excellent resistance to oxidation and thermal shock. Silicon oxynitride is commonly used as a refractory material.

SiAlON's and O'—SiAlON's are known compounds and common methods for producing them include:

(i) Reaction Sintering

Mixtures of two or more of the following: $Si_3N_4$, $SiO_2$, $Si_2N_2O$, $Al_2O_3$ and AlN, are sintered at $\geq1600°$ C. under a nitrogen atmosphere, usually in the presence of a rare earth sintering aid such as $Y_2O_3$ or $CeO_2$. This process involves expensive raw materials and high temperatures, but allows good control over the composition and purity of the product.

(ii) Carbothermal Reduction

Aluminosilicate materials are blended with carbon and fired at $\geq1350°$ C. under a flowing nitrogen atmosphere. This process is described as carbothermal reduction because the carbon acts by reducing the aluminosilicate, allowing nitridation to occur. This process involves cheap raw materials and lower firing temperatures than for reaction sintering but impurities in the aluminosilicate can degrade the properties of the product. The process is difficult to control because it involves stopping a reaction at a specific point prior to completion.

(iii) Combustion Synthesis

A mixture containing silicon metal powder is ignited under a nitrogen atmosphere. The energy evolved by this strongly exothermic nitridation of silicon propagates a reaction front through the reaction mixture. This method is very rapid and energy efficient but is difficult to control.

Methods (ii) and (iii) both yield SiAlON powders which must then be formed and sintered to obtain a ceramic body. Method (i) is the most commonly used method for preparing O'—SiAlON. As is apparent from the above known methods, in order to get good control over the composition and purity of the product expensive raw materials and/or extreme reaction conditions are required.

European patent application EP 0153000 to Kennecott Corporation discloses a bonded material consisting of granular silicon carbide and a bonding phase comprising $Si_3N_4$ which has been modified by the presence of oxygen and aluminium. Also disclosed is a method for the manufacture of the bonded material which includes the use of bentonite clay as a temporary binder. The amount of this bentonite clay in the raw starting material is disclosed as being about 0.5% by weight. The starting materials are disclosed as being silicon carbide, aluminium powder, silicon powder plus optional processing aids and temporary binders. The use of temporary binders, and thus the bentonite clay, is optional. There is no disclosure of the use of a clay material as a basic aluminium and silicon source, nor is there disclosure of the use of clay to facilitate slipcasting or extrusion.

Canadian patent 1,156,685 to Dresser Corporation is directed to a method for producing nitride bonded refractory shapes in situ from a mixture comprising silicon, crude clay, and a graded refractory aggregate. The intention is to form nitride phases in situ to avoid the cost of purchasing silicon nitride for example. The amount of crude clay used in the process is stated as being between 1 and 5% and the refractory aggregate may be fire clay amongst other options. The refractory aggregate used in the process is a non-reactive bulking agent and the crude clay facilitates densification during pressing and facilitates the formation of β'-SiAlON and silicon oxynitride. The examples (see Table 1) do not form a SiAlON when reacting the basic components together. There is no disclosure of the production of O'—SiAlON. There is no disclosure of the intention to form O'—SiAlON as the major or sole product. Clay is deliberately added at very low levels and there is no intention to use clay as a basic source of silicon and aluminium in the production of O'—SiAlON or to facilitate slipcasting or extruding.

U.S. Pat. No. 4,360,506 to Societe Europeenne des Produits Refractaries. This United States patent discloses a method for producing β-SiAlON's by heating in a nitrogen atmosphere agglomerated elements obtained by drying a paste comprising a silico-aluminous material, carbon, and fine particles of a ligneous material. The silico-aluminous material can be a clay such as a kaolin clay. It is essential to the process that carbon, preferably carbon black, and a ligneous material, such as sawdust be used. There is no disclosure of the use of silicon metal and the process relies on the reduction of the silica-aluminous material by carbon. There is no disclosure of the intention to form O'—SiAlON as a major or sole product.

European patent application 0317980 to The Norton Company discloses a process for the manufacture of a refractory material by mixing appropriate amounts of silicon metal powder, fine reactive alumina, a fine silica source (eg bentonite clay), a binder and a liquid dispersant, forming a shape and heating the shaped body in a nitrogen atmosphere. The bentonite clay is disclosed as being used in only a 0.5–2 w/o amount. Fine reactive alumina is an essential component of the process. There is no disclosure of the clay component being an essential part of the reaction sequence or as the source of the alumina component.

The process of the present invention relies on the use of a clay material as a basic source of process components and the ability of the clay material to react with the other process components to form O'—SiAlON under suitable reaction conditions. Further, the use of clay in the process facilitates the formation of shaped ceramic bodies comprising O'—SiAlON.

It is an object of the invention to provide an improved process for the manufacture of O'—SiAlON ceramic materials and composite ceramic materials containing O'—SiAlON.

SUMMARY OF THE INVENTION

In broad terms the invention in a first aspect comprises a process for the production of O'—SiAlON from a mixture of silicon metal, nitrogen and clay, wherein the process comprises heating the silicon metal and clay in a flowing nitrogen atmosphere to a temperature sufficient to react the components to form O'—SiAlON and wherein the clay participates in the reaction as a source of aluminium and silicon.

In broad terms the invention in a second aspect comprises a process for the production of O'—SiAlON from a mixture of silicon metal, nitrogen and clay, wherein the process comprises dehydroxylating the clay, mixing the dehydroxylated clay with the silicon metal, and heating the combination under a flowing nitrogen atmosphere to a temperature sufficient to react the mixture to form O'—SiAlON and wherein the dehydroxylated clay participates in the reaction as a source of aluminium and silicon.

Preferably the clay is the sole source of aluminium.

Preferably silica is included in the mixture.

Preferably the clay is a hydrated layer aluminosilicate.

Preferably the clay is selected from kaolin, montmorillonite, halloysite, bentonite and pyrophyllite clays.

Preferably the clay is dehydroxylated by precalcining.

Preferably the clay is dehydroxylated by heating to a temperature between about 500° C. and about 800° C.

Preferably the components of the mixture are present as fine powders.

Preferably the mixture contains between about 5% and about 60% by weight of clay and more preferably between 10% to 40% by weight of clay.

Preferably the mixture contains, by weight, about 20% to 50% clay, 0% to about 25% silica and about 40% to about 60% silicon metal and, more preferably, 30%–40% clay, 10%–20% silica, and 40%–55% silicon metal.

Preferably the flowing $N_2$ atmosphere comprises ≦0.5% oxygen and ≦0.5% water vapour, and more preferably ≦10 ppm oxygen and ≦25 ppm water vapour.

Preferably the $N_2$ flow rate is between about 3 and about 20 $ml.min^{-1}.g^{-1}$ by weight of silicon in the sample, and more preferably between 3 and 15 $ml.min^{-1}.g^{-1}$.

Preferably the mixture is heated to between about 1100° C. and about 1900° C., more preferably between 1300° C. and 1900° C., more preferably between 1300° C. and 1600° C. and most preferably to 1450° C. to form the O'—SiAlON.

Preferably the components are heated at a rate of up to about 10° C. per minute, more preferably between about 0.2° C. and about 10° C. per minute, more preferably between 1° C. and 7° C. per minute, more preferably between 1° C. and 6° C. per minute, and most preferably between 2° and 5° C. per minute.

Preferably the components are held at the required temperature until the reaction is complete, preferably between about 4 and about 60 hours and more preferably between about 4 and 12 hours.

Preferably additive compounds are included to enhance the reaction and/or to promote sintering.

Preferably the additive compounds are selected from $Y_2O_3$, $Fe_3O_4$, $ZrO_2$, $ZrSiO_4$, MgO and β-SiAlON.

Preferably the product formed contains greater than 75% O'—SiAlON by weight of product and more preferably greater than 80% O'—SiAlON.

In more limited terms a third aspect of the invention comprises a process for the production of O'—SiAlON from a component mixture comprising, by weight, 40%–60% silicon metal, 20%–50% clay, and 0%–25% silica, the process comprising the steps of:

(a) dehydroxylating the clay prior to inclusion in the component mixture;

(b) heating the component mixture at a rate of 1° C. to 6° C. per minute, to a temperature of between substantially 1300° C. to 1900° C. under a flowing $N_2$ atmosphere having preferably ≦0.5% oxygen and preferably ≦0.5% water vapour and more preferably ≦10 ppm oxygen and ≦25 ppm water vapour;

(c) holding the temperature between 1300° C. and 1900° C. for up to 12 hours; and (d) recovering the product.

In broad terms the invention in a fourth aspect comprises a process for the production of a composite ceramic material including O'—SiAlON from a mixture of components comprising a ceramic material and an O'—SiAlON forming component combination of silicon metal, clay and nitrogen wherein the process comprises heating the ceramic material, silicon metal and clay in a flowing nitrogen atmosphere to a temperature sufficient to form the O'—SiAlON composite ceramic and wherein the clay participates in the reaction as a source of silicon and aluminium.

Preferably the component combination further comprises silica.

Preferably the clay is the sole source of aluminium in the manufacture of the O'—SiAlON.

Preferably the ceramic material included in the mixture is selected from silicon carbide (SiC), alumina ($Al_2O_3$), silicon nitride ($Si_3N_4$), SiAlON, zirconia ($ZrO_2$), zircon ($ZrSiO_4$) and silica ($SiO_2$).

Preferably the ceramic material included in the mixture is coarser than the other mixture components which react to form the O'—SiAlON.

Preferably the ceramic material included in the mixture will constitute up to 75% by weight of the mixture and more preferably between about 40% and about 70% by weight of the mixture.

In more limited terms a fifth aspect of the invention comprises a process for the production of a composite ceramic including O'—SiAlON from a mixture of components comprising, by weight, up to 75% of a ceramic material and 25% or more of an O'—SiAlON forming mixture, wherein the O'—SiAlON forming mixture comprises, by weight, 40%–60% silicon metal, 20%–60% clay, and 10%–25% silica, the process comprising the steps of:

(a) heating the component mixture at a rate of between substantially 1.0° C. to 6° C. per minute, to a temperature of between substantially 1300° C. to 1900° C. under a flowing $N_2$ atmosphere having ≦0.5% oxygen and ≦0.5% water vapour;

(b) holding the temperature between 1300° C. and 1900° C. for up to 12 hours; and (c) recovering the product.

DESCRIPTION OF THE DRAWINGS

The attached Figures show X-ray diffraction patterns of O'—SiAlON products formed by the process of the invention. The standard O'—SiAlON and SiC X-ray diffraction XRD patterns were supplied by the International Centre for Diffraction Data, USA and the product X-ray diffraction patterns were obtained from a Phillips 1700 Series Diffractometer controlled by Phillips APD1700 software.

In the Figures

FIG. 11 shows XRD results of O'—SiAlON formed in Example 10 and plotted in FIG. 10.

FIGS. 12 and 13 show the effect of additives on O'—SiAlON production.

FIGS. 15 and 16 show the effect of a second ceramic component in the production of O'—SiAlON composite products.

FIG. 17 shows the XRF analyses of the samples processed in Example 16.

FIG. 18 shows the composition of O'—SiAlON reaction mixtures prepared for the various clay minerals in Example 16, the weight changes during reaction, and XRD analyses of the products.

DETAILED DESCRIPTION OF THE INVENTION

Figure 1:
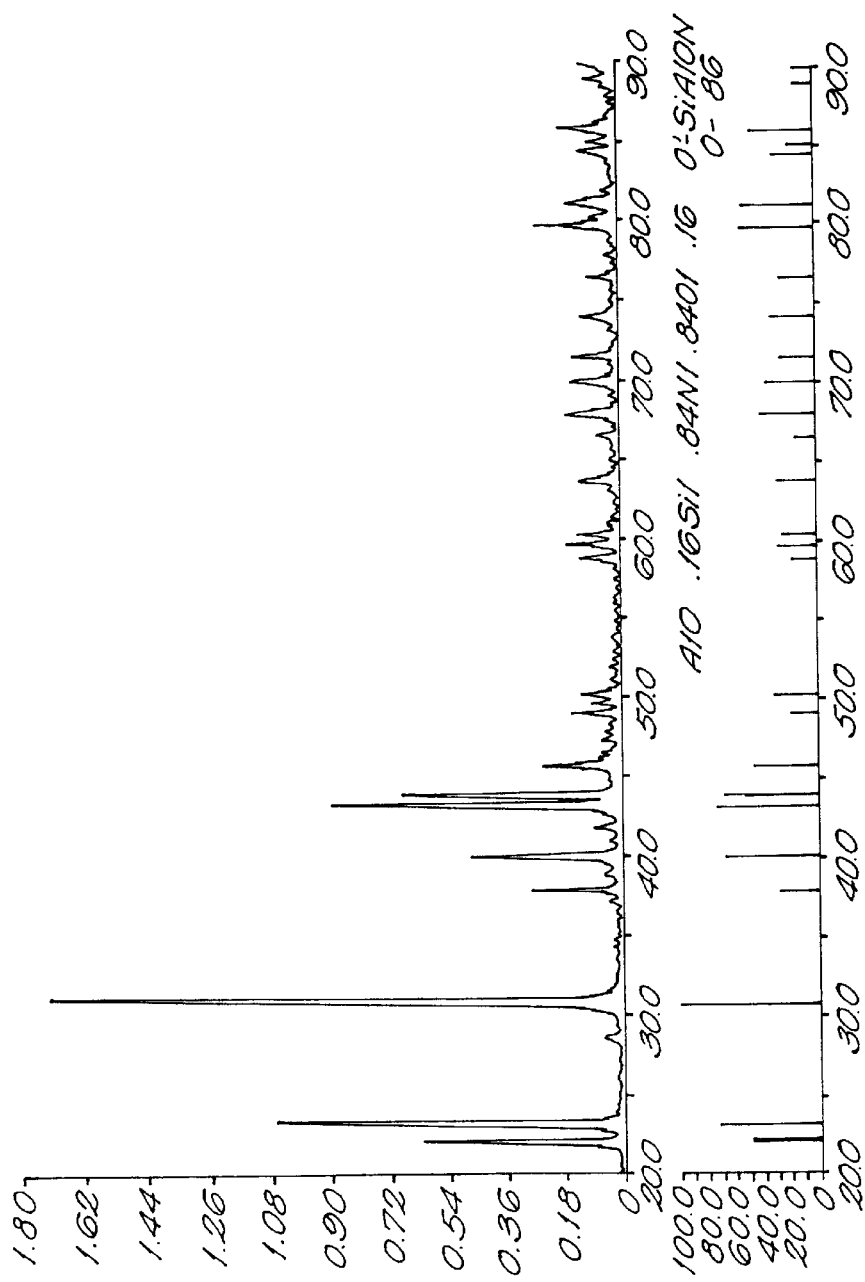
FIG. 1 shows a comparison between the X-ray diffraction pattern for the product formed by the process of Example 2 and a standard O'—SiAlON pattern.

The process of the present invention is a novel process directed to the preparation of O'—SiAlON from silicon metal, clay and silica ($SiO_2$). The raw material should be in fine powder form. The clay may be dehydroxylated prior to use, however retention of the clay in its natural plastic form will allow the mixture to be more readily formed into a desired shape prior to firing.

The raw materials may be blended by standard techniques such as ball milling or the like as will be known in the art. Following blending, if the clay is retained in its natural form, the raw materials can be fabricated into the desired shape by traditional methods of pressing, slip casting, or extruding and the more advanced methods including isostatic pressing and injection moulding as is known in the art. These methods may involve the use of pressing aids, binders, dispersants and lubricants for example. The mixture is then placed in a furnace or kiln or the like and heated under a flowing nitrogen atmosphere to temperatures greater than 1300° C. at an appropriate rate and held at this temperature until the reaction is complete. Four to eight hours is generally sufficient although longer times may be required at lower temperatures.

For commercial processes, to ensure complete reaction the sample may be held at temperature for times as long as 60 hours or more, although it is likely 12 hours will probably be sufficient. This will depend on a number of factors, such as the size of the sample and temperature and atmospheric variations within the furnace, as will be apparant to a person skilled in the art. It may also be beneficial to hold the material at a lower temperature than desired to form the O'—SiAlON for a period of up to 8 hours. This will result in a two tiered firing regime which may be desirable commercially to allow completion of the surface nitridation reaction. This lower holding temperature will preferably be between 1100° C. and 1300° C. The nitrogen flow rate should be as low as possible, but should be sufficient to replace nitrogen consumed by the reaction, and maintain an atmosphere with preferably $\leq 0.5\%$ oxygen and preferably $\leq 5\%$ water vapour inside the furnace or kiln. To form very pure O'—SiAlON the flowing nitrogen atmosphere should have as low a level of oxygen and water vapour as possible. Levels of 10 ppm oxygen and 25 ppm water vapour or below, are preferred. For the sample sizes as used in the examples, nitrogen flow rates of between about 3 and 20 $ml.min^{-1}.g^{-1}$ by weight of silicon in the sample were found to suffice. The oxygen and water vapour content of the atmosphere should be kept to a minimum as these factors can affect the process by attacking the unreacted silicon powder. During the reaction the nitrogen in the furnace atmosphere becomes incorporated into the product via a nitridation reaction giving an increase in density. The product formed is primarily O'—SiAlON although small amounts of silicon nitride, mullite, and other SiAlON phases may also be formed.

It has been found that dehydroxylation of the clay prior to mixing with the silicon metal is beneficial to the production of O'—SiAlON in pure form. For example at about 500°–800° C., clay undergoes this dehydroxylation reaction and forms a reactive intermediate as is well known in the art. This dehydroxylation will also occur when the process is carried out in a single firing (ie without dehydroxylation of the clay prior to mixing with the other process components). For example, if kaolin clay is used in the process then a reactive amorphous intermediate is formed which is commonly referred to as meta-kaolin. This amorphous intermediate reacts with silicon metal and nitrogen from the flowing nitrogen atmosphere, to form silicon aluminium oxynitrides (SiAlON's) under suitable conditions. Formation of the reactive clay intermediate facilitates the use of relatively low temperatures in the process.

The dehydroxylation of the clay prior to mixing with the other raw materials may be achieved by methods such as precalcining as will be known in the art. If the dehydroxylation step is not done prior to mixing the clay with the silicon metal and silica it appears that the water released as the clay dehydroxylates on heating can partially prevent the silicon from reacting (see Example 6).

While the removal of water from the clay prior to mixing with the other components in the mixture will enhance the production of the O'—SiAlON product this step is not essential to the process. Dehydroxylating the clay prior to mixing increases the purity of the O'—SiAlON formed in the process however the benefits of clay with regard to slip-casting and extruding for example, will no longer be available.

In the process of the invention the clay material provides a source of silicon and aluminium for the reaction. While it is possible to include other sources of aluminium, the process of the present invention does not require this and the clay used is preferably the sole source of aluminium for the reaction. As a result of the extensive use of clay the provision of raw material for the process is cheaper than for prior art processes and the complexity of the procedures involved in producing O'—SiAlON products is lowered.

Some reaction between the reaction components occurs during the heating stage, and therefore the holding step for up to eight hours is optional. However, the reaction accelerates between 1400° C. and 1450° C. as the silicon begins to melt (at approximately 1414° C.). Holding the furnace at a temperature greater than 1450° C. is also optional but may be used to force the reaction to completion, or to sinter the body to obtain better densities. A heating rate of between 1° C. per minute and 10° C. per minute has been found to be suitable however the heating rate should preferably be between 1° C. and 7° C. per minute. More preferably the heating rate should be between 1° C. per minute and 6° C. per minute and most preferably between 2° C. and 5° C. per minute. The process will however work at heating rates as low as 0.2° C. per minute and this may in fact occur as, on a commercial scale, large furnaces can be slow to heat resulting in such lower heating rates.

The preferred temperature range to which the mixture of components is heated is between 1300° C. and 1600° C. as, at higher temperatures, specialised furnaces or kilns may be required. If impurities are present in the silicon then it's melting point may be lowered and in such cases reaction may proceed at lower temperatures.

Temperatures as low as about 1100° C. are envisaged as being possible. For example, in the case of Fe particularly, there is a eutectic between Fe and Si at about 1190° C. which would allow the Si to melt at the lower temperature and thus allow the reaction to proceed. While it has been found that natural clay products containing iron impurities may be usefully used in the process of the invention, the presence of Ca, Na, and Ba impurities have been found to hinder the reaction. Addition of small amounts of $ZrO_2$ also permits the reaction to proceed at lower temperatures.

As will be readily apparent to a person skilled in the art, the type of furnace or kiln used must be able to maintain a controlled internal atmosphere at the temperatures required. Any type of furnace or kiln which is capable of this may be used.

Ceramic or ceramic composite bodies formed and reacted at 1300°–1600° C. can be sintered at higher temperatures (1600°–1900° C.) to increase the density and reduce the porosity of the product. This sintering can be performed in a second firing or as a second, higher temperature, stage of a single firing step. Sintering will be accompanied by an amount of shrinkage in the product.

Examples of reactions to produce O'—SiAlON (x=0.2) from New Zealand China Clays (NZCC) premium grade halloysite and BDH light kaolin are shown in equations in (i) and (ii) respectively. The amount of each raw material must be balanced to provide the correct Si:Al:O:N ratio for the desired O'—SiAlON as will be known in the art. $SiO_2$ is required to achieve the appropriate stoichiometry. In some cases where clays are particularly siliceous or contain large amounts of native free silica, it may not be necessary to add silica to achieve the appropriate stoichiometry, as in the case of the pyrophyllite, bentonite and rheogel clays in Example 16.

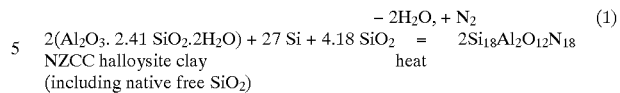
$$2(Al_2O_3 \cdot 2.41\, SiO_2 \cdot 2H_2O) + 27\, Si + 4.18\, SiO_2 \xrightarrow[\text{heat}]{-2H_2O,\, +N_2} 2Si_{18}Al_2O_{12}N_{18} \quad (1)$$
NZCC halloysite clay
(including native free $SiO_2$)

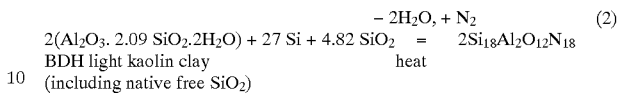
$$2(Al_2O_3 \cdot 2.09\, SiO_2 \cdot 2H_2O) + 27\, Si + 4.82\, SiO_2 \xrightarrow[\text{heat}]{-2H_2O,\, +N_2} 2Si_{18}Al_2O_{12}N_{18} \quad (2)$$
BDH light kaolin clay
(including native free $SiO_2$)

If the correct balance of raw materials is used then the production of O'—SiAlON in the resultant ceramic is maximised. This balance of material will be able to be calculated readily by a person skilled in the art and will depend largely on the type of clay used in the reaction. The process of the present invention can produce a product containing over 75% O'—SiAlON and is capable of producing a product containing over 80% of O'—SiAlON. The percentage of clay used can be as low as 5% by weight and, in such a case, the proportions by weight of silica and silicon metal will be approximately 40% and 55% respectively. The preferred percentage makeup of the starting component mixture is however between 20%–45% clay, 10%–25% silica and 40%–60% silicon metal.

As will be apparent to a person skilled in the art a variety of clays may be used in the process. Clays that can be used are the hydrated layer aluminosilicates generally. The preferred clays are the kaolin clays however the pyrophyllite and the montmorillonite clays, such as bentonite, may also be used. Other types of clay, such as illites for example, may also be used however most will contain a variety of impurities such as K, Na, Ca, Mg and Fe together with the aluminosilicate content. These impurities may detrimentally affect the purity of the SiAlON product formed by the process of the invention. In some cases however, for example with Mg and Fe, the impurities may have positive effect.

The process can also be used to fabricate composite ceramics containing O'—SiAlON. In these processes the O'—SiAlON is used to bond together grains of other ceramic materials such as silicon carbide (SiC) (see Example 5), alumina ($Al_2O_3$), silicon nitride ($Si_3N_4$), SiAlON, zirconia ($ZrO_2$), zirconia ($ZrSiO_4$) or silica ($SiO_2$). These bonded materials take little or no part in the reaction chemistry. They will preferably be coarser than the raw materials which react to form the bonding phase, and will preferably constitute up to 75% of the starting mixture and thus of the resultant fired ceramic. Preferably the additional ceramic will constitute between 40% and 70% of the mixture. The additional ceramic is preferably coarser in order to get better packing of the grains prior to firing which allows higher fired densities to be obtained. Further, as the additional ceramic is coarser it is less likely to influence the O'—SiAlON reaction. This is particularly relevant in the case of silicon carbide and silica. The additional ceramic material is bonded by a matrix of O'—SiAlON formed by the other components in the starting mixture (ie the clay, silica (if present), and silicon). These other components will therefore constitute between 25% and 99% of the total starting mixture and will be present in the preferred percentage amounts that have been discussed previously.

When proceeding with the process of manufacturing a composite ceramic containing O'—SiAlON there appears to be no significant benefit in dehydroxylating the clay material used prior to mixing the raw materials. Dehydroxylation of the clay material prior to manufacture of the non-composite O'—SiAlON ceramic, as has been discussed previously, enhances the production of the O'—SiAlON ceramic by removing water which can attack the silicon and thus detrimentally affect the process. It is thought that the water content of the clay has less effect when manufacturing the composite ceramic materials due to a dilution effect based on the presence of additional materials (ie the additional grains of the other ceramic materials). When using lower amounts of additional ceramic however, dehydroxylation of the clay prior to mixing may be of benefit. This can be seen in Example 9 and in FIGS. 8 and 9a. The natural properties of the clay material can thus be more readily utilised to preform the desired shape of the composite ceramic prior to firing.

The reaction to form the non-composite O'—SiAlON is generally accompanied by an amount of shrinkage when the natural clay material is used in the process. When the clay material has been dehydroxylated prior to use in the process such shrinkage is reduced. When the process is used to form the composite ceramic material and natural (non-dehydroxylated) clay is used this shrinkage can become negligible allowing near nett size shapes to be formed. As a result of the use of natural clay in the process there is a great flexibility in the shape and size of ceramic components which can be produced by the process of the present invention.

The method of the present invention is capable of producing either ceramic bodies or ceramic powder containing the O'—SiAlON in a single firing step. As will be apparent when clay material is dehydroxylated prior to use the process will then have two firing steps. The first to dehydroxylate the clay and the second to form the ceramic material containing O'—SiAlON. To make a ceramic powder the reaction will proceed without an emphasis on the densification of the resulted ceramic. For example, the starting materials can be formed into pellets, reacted to form a soft ceramic pellet of O'—SiAlON which is then ground into a powder. This may be used as a supply of O'—SiAlON powder for use in other processes. For example the powder could be formed and sintered with or without sintering aids such as $Y_2O_3$ or the like, to form fully densified ceramic bodies.

Various additives can be used in order to enhance the process of the invention or to promote sintering. It has been found that iron oxides (such as $Fe_3O_4$) zirconia ($ZrO_2$), zircon ($ZrSiO_4$) and β-SiAlON promote the reaction. Yttria ($Y_2O_3$) is known to be a useful sintering aid for O'—SiAlON.

EXAMPLES

Example 1

A 10 g mixture of:
36.9% New Zealand China Clays Premium Grade Halloysite Clay;
49.1% Permascand 4D Silicon; and
14.0% Superfine Quartz Powder (supplied by Commercial Minerals Ltd);
was blended by ball-milling with ca. 400 g of 10 mm diameter $Si_3N_4$ balls and 70 g of hexane in a one liter high density polyethylene (HDPE) bottle for 20 hours at ca. 150 rpm. The hexane solvent was removed by rotary evaporation. Samples of powder were blended with 5% oleic acid to act as a pressing aid and binder. Ethanol was used to disperse the acid, and was later allowed to evaporate off under ambient conditions. The powder was brushed through a 295 μm sieve to granulate it, and then pressed at ca. 75 MPa in a 20 mm diameter die. The pressed discs were heated at 0.5° $C.min^{-1}$ to 400° C. for 30 minutes under nitrogen atmosphere to remove the oleic acid. Two 1.3 g discs were fired in a tube furnace on a bed of sialon granules under an atmosphere of "oxygen-free" nitrogen (<10 ppm $O_2$, <25 ppm $H_2O$, supplied by BOC)—flowing at ca 50 ml $min^{-1}$. The samples were heated at 2° $C.min^{-1}$ to 1450° C. and held at that temperature for 2 hours.

The discs increased in mass by ca. 18% during the firing, and an analysis of the products by X-ray powder diffraction (XRD) revealed primarily O'—SiAlON with traces of β-SiAlON and X-Phase SiAlON.

Example 2

A mixture of:
30.7% dehydroxylated BDH Light Kaolin Clay (dehydroxylated at 800° C. for one hour);
50.1% Permascand 4D Silicon; and
19.2% Superfine Quartz Powder (supplied by Commercial Minerals Ltd);
was prepared and fired as in Example 1.

The discs increased in mass by ca. 22% during the firing, and a linear shrinkage of 4.5% was measured. An analysis of the products by X-ray powder diffraction (XRD) (see FIG. 1) revealed primarily O'—SiAlON with a trace of X-Phase SiAlON. The bulk density and open porosity of the fired pellets were measured by evacuation and water saturation:
bulk density=2.06 $g.cm^{-3}$ (74% of theoretical)
open porosity=26.8%

Example 3

A 10 g mixture of:
30.4% dehydroxylated BDH Light Kaolin Clay (dehydroxylated at 800° C. for one hour);
49.6% Permascand 4D Silicon;
19.0% Superfine Quartz Powder (supplied by Commercial Minerals Ltd); and
1.0% Sigma Yttrium Oxide ($Y_2O_3$);
was prepared and fired as in Example 1.

The discs increased in mass by ca. 22% during the firing, and a linear shrinkage of 10.8% was measured. An analysis of the products by X-ray powder diffraction (XRD) revealed primarily O'—SiAlON with β-$Si_3N_4$ and a trace of X-Phase SiAlON. The bulk density and open porosity of the fired pellets were measured by evacuation and water saturation in water:
bulk density=2.51 $g.cm^{-3}$
open porosity=9.0%

Example 4

A mixture of:
30.4% dehydroxylated BDH Light Kaolin Clay (dehydroxylated at 800° C. for one hour);
49.6% Permascand 4D Silicon;
19.0% Superfine Quartz Powder (supplied by Commercial Minerals Ltd); and
1.0% Pronalys AR Magnesium Oxide (MgO);
was prepared and fired as in Example 1.

The discs decreased in mass by ca. 1.5% during the firing, and a linear shrinkage of 10.8% was measured. An analysis of the products by X-ray powder diffraction (XRD) revealed primarily O'—SiAlON with traces of β-$Si_3N_4$ and X-Phase SiAlON. The bulk density and open porosity of the fired pellets were measured by evacuation and water saturation:

bulk density=2.39 g.cm$^{-3}$
open porosity=4.7%

Example 5

This example demonstrates the fabrication of a composite ceramic product (SiC/SiAlON) formed by slip casting. The proportions of clay, silicon and silica used in the starting mixture being sufficient to form O'—SiAlON which bonds to the additional ceramic (SiC) to form a near nett size composite ceramic shape. A mixture of:
- 60% Navarro 36-grit silicon carbide (SiC)
- 14.4% New Zealand China Clays Premium Grade Halloysite Clay
- 19.2% Simcoa Silicon Dust (mean size=3.5 μm)
- 6.4% Pemco-325 Fused Silica (SiO$_2$)

was blended to a slurry with ca 25% water and 0.2% Dispex N40 dispersant in a Hobart mixer. This slip was used to cast a 425 mm long closed end tube (ca 1.6 kg). This slip was used to cast 5 bars (175×25×25 mmm, ca 300 g dry weight) and 5 cubes (50×50×50 mm, ca 240 g dry weight). The pieces were heated under flowing "oxygen free" nitrogen (45 l.min$^{-1}$) to 1450° C. and held at that temperature for 6 hours.

Figure 2:
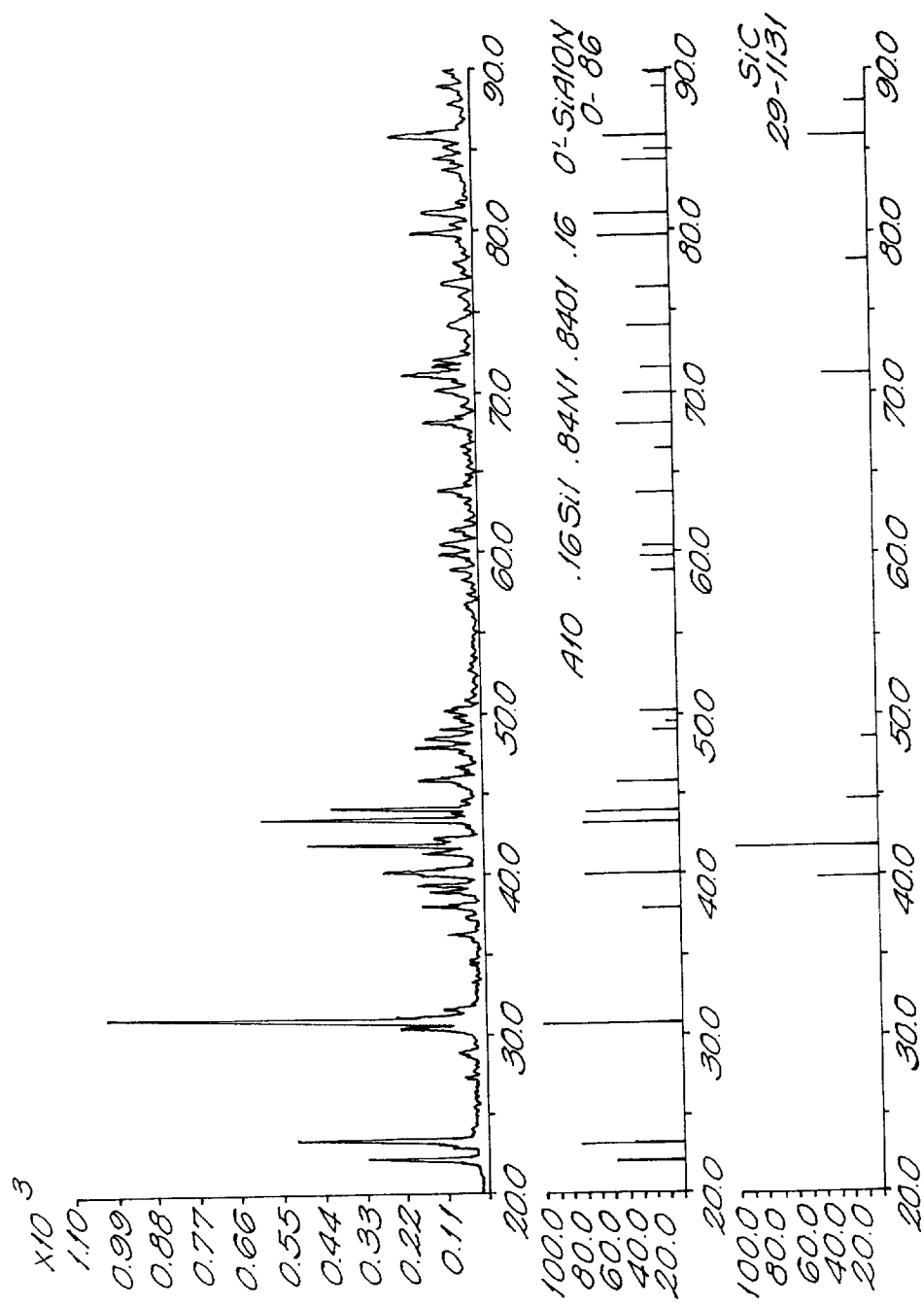
FIG. 2 shows a comparison between the X-ray diffractive pattern for the composite product formed by the process of Example 5 and standard O'—SiAlON and SiC patterns.

A shrinkage of ca 0.5% was measured during drying, but there was no significant size change during firing. Analysis of the products by X-ray powder diffraction (XRD) (see FIG. 2) revealed primarily SiC and O'—SiAlON with a trace of β-Si$_3$N$_4$. The bulk density and open porosity of the fired pieces were measured by evacuation and water saturation. The 5 bars were used to determine the modulus of rupture by the 3-point method (ASTM C 133), and the 5 blocks were used to determine the cold crushing strength. A piece (50×8×8 mm) cut from one of the broken bars was used for measuring the thermal expansion, using a Harrop Laboratories dilatometer.

| | |
|---|---|
| average bulk density | = 2.60 g · cm$^{-3}$ (85% of theoretical) |
| average open porosity | = 13.4% |
| modulus of rupture | = 27 MPa |
| cold crushing strength | = 138 MPa |
| thermal expansion | = 2.6 × 10$^{-6}$ · °C.$^{-1}$ from 25° C. to 100° C. |
| | = 3.8 × 10$^{-6}$ · °C.$^{-1}$ from 25° C. to 1000° C. |

Example 6

At temperatures below 1600° C., O'—SiAlON is stable over the following composition range: Si$_{2-x}$Al$_x$O$_{1+x}$N$_{2-x}$ where 0<x≦0.2. Mixtures (24 g) containing Permascand 4D silicon, Superfine Quartz Powder (from Commercial Minerals), and either BDH kaolin, NZCC halloysite, dehydroxylated BDH kaolin or dehydroxylated NZCC halloysite, were prepared with the correct stoichiometry to give O'—SiAlON with x=0.2. For example:

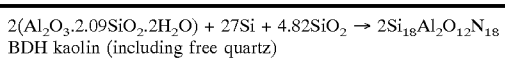
BDH kaolin (including free quartz)

Figure 3:
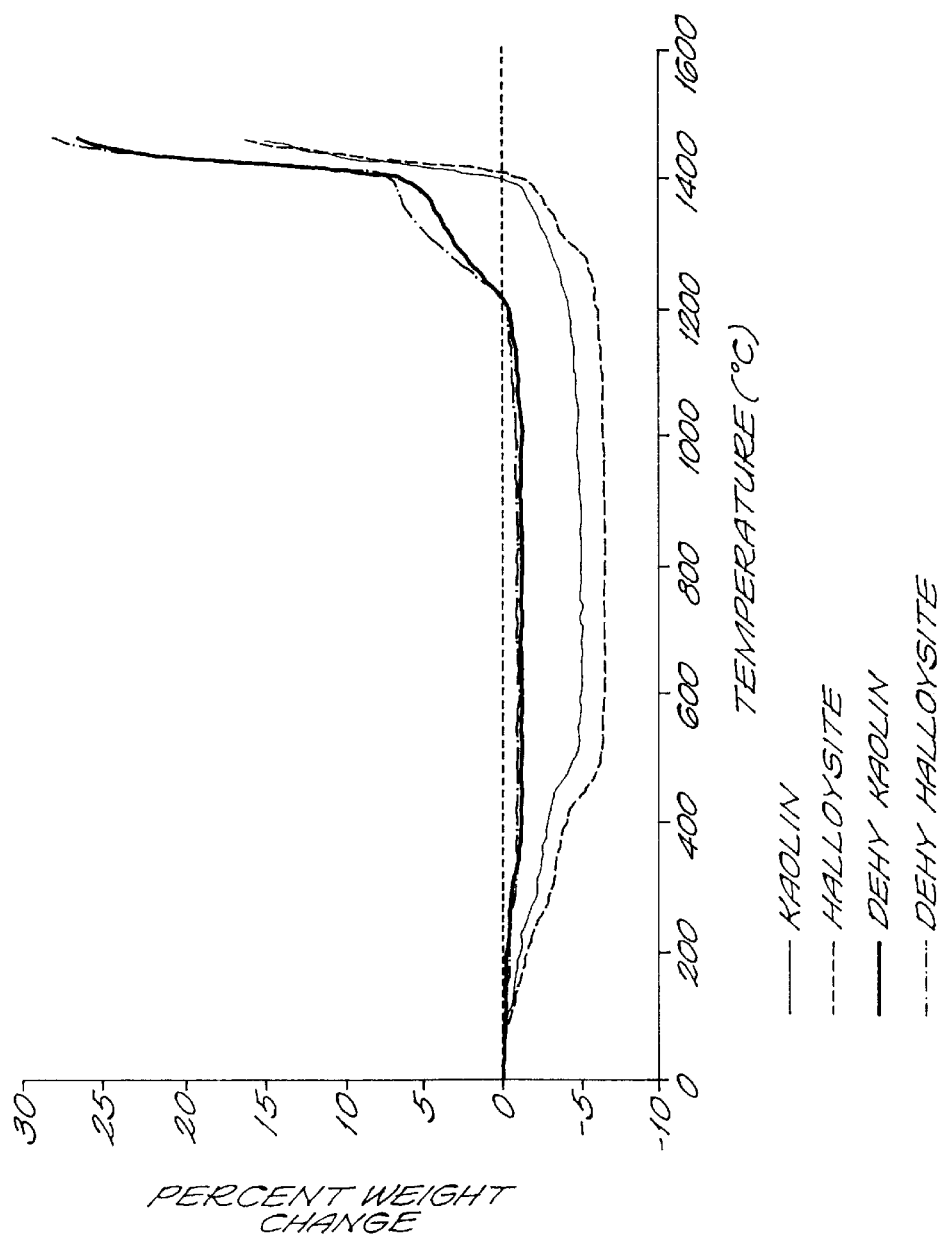
FIG. 3 shows the mass curves of the O'—SiAlON reaction using raw and dehydroxylated clays.

These mixtures were blended by ball milling in 1 liter HDPE bottles for 20 h under hexane (170 g) with Si$_3$N$_4$ balls (950 g, 10 mm diam). The solvent was removed by rotary evaporation, and samples of the dried powders were lightly pressed (8 MPa) to form pellets (1 g, 10 mm diam.), and heated under "oxygen-free" nitrogen at 2° C.min$^{-1}$ to 1450° C. for 2 h in a Mettler Thermobalance. The resulting mass curves are plotted in FIG. 3.

These mass curves show 3 main features:
(i) weight loss between room temperature and 500° C.
(ii) an initial nitridation reaction beginning at ca 1200° C., which by comparison with the well known silicon nitride reaction bonding process, is probably due to surface nitridation of the silicon powder.
(iii) a rapid nitridation reaction at ca 1400° C., comparable with that observed in the silicon nitride reaction bonding process.

The samples containing raw (non-dehydroxylated) clays showed a weight loss at ca 500° C. consistent with the loss of structural water from the clays.

The initial nitridation reaction at 1200°–1300° C. is stronger for the dehydroxylated clays, and appears to be suppressed for the non-dehydroxylated clay, particularly when ball-milled. This is probably due to a water-silicon reaction during milling or the early stages of firing (<500° C.), giving the silicon an impermeable oxide coating which prevents surface nitridation. Suppression of the surface nitridation reaction was also accompanied by the formation of unreacted silicon nodules in the product, and therefore should be avoided where possible. These nodules can be greater than 1 mm in diameter and, once they form, have such a low surface area that if any nitridation does occur it is extremely slow.

Example 7

Figure 4:
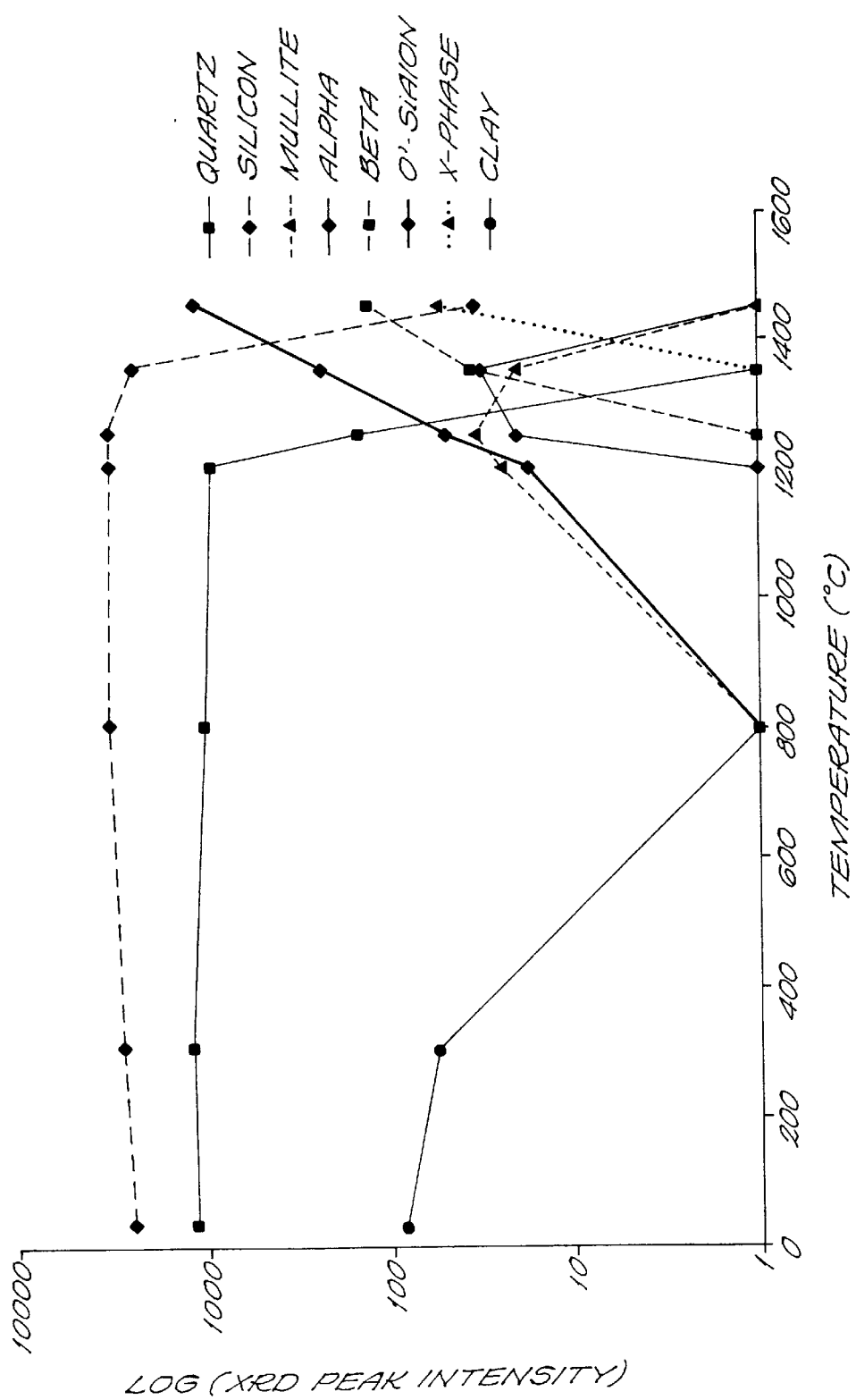
FIGS. 4 and 5 show XRD peak intensity v temperature for the O'—SiAlON reaction.
Figure 5:
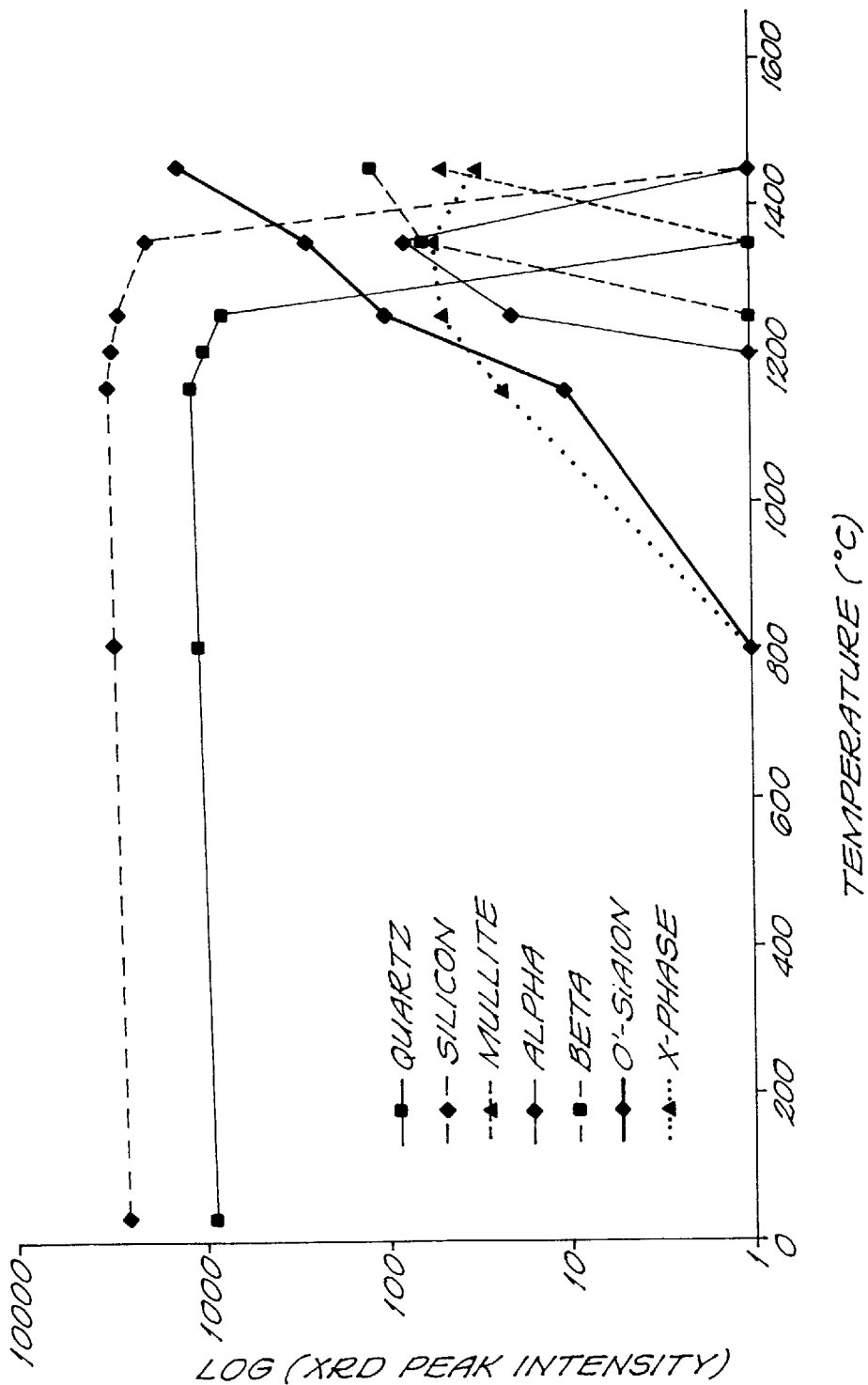
Figure 6:
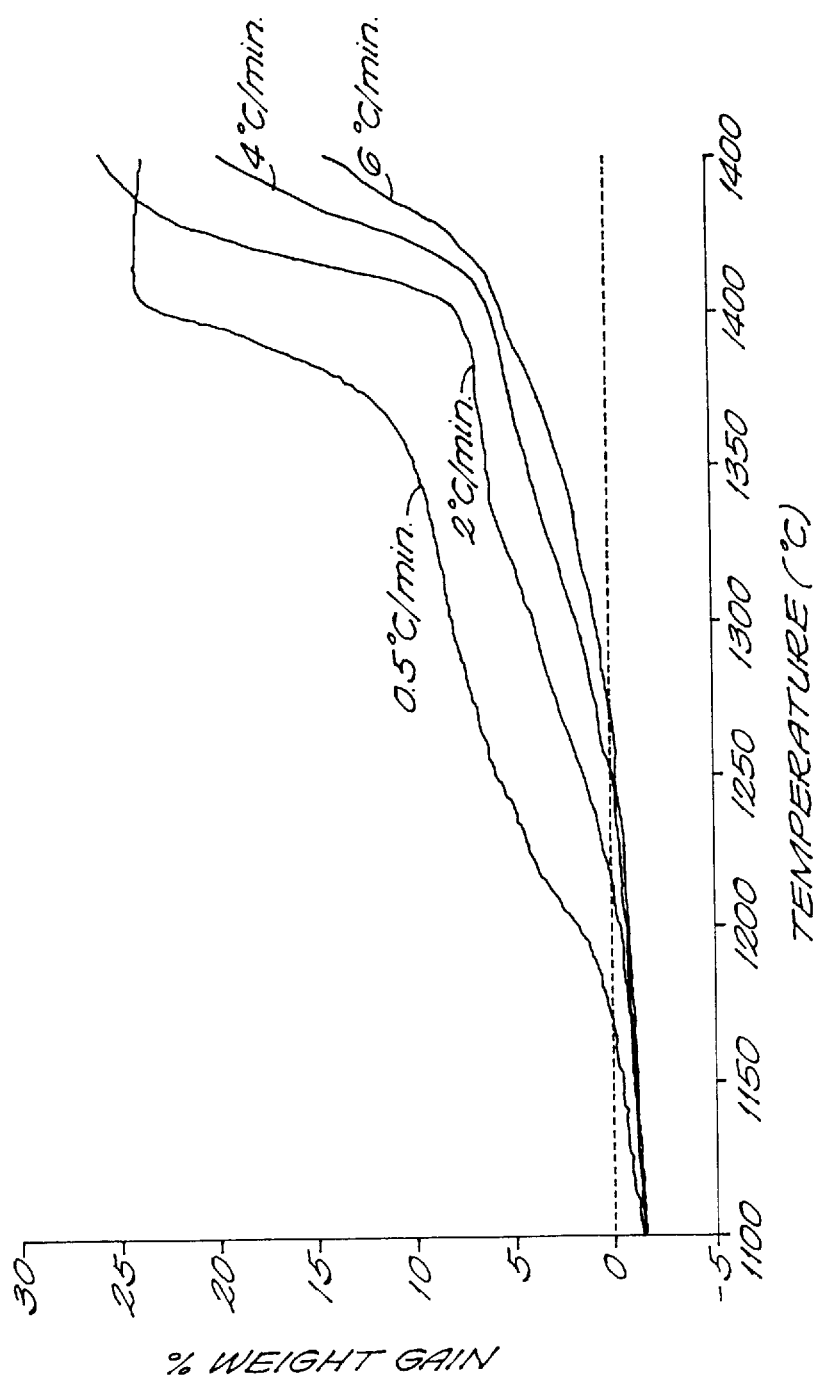
FIG. 6 shows the effect of the heating rate on the O'—SiAlON reaction profile.

Samples of the reaction mixtures containing raw kaolin and dehydroxylated kaolin prepared as described in Example 6 were heated at 2° C. min$^{-1}$ under nitrogen to various temperatures between room temperature and 1450° C. XRD analyses of the products are shown in FIGS. 4 and 5. The intensities of the strongest XRD peaks for all identified phases are plotted on a log scale. The results are non-quantitative but give an indication of the appearance and disappearance of different phases during the nitridation reaction. For simplicity, α-silicon nitride and α-SiAlON, and β-silicon nitride and β-SiAlON have been grouped together as α-phase and β-phase, respectively. Notable features of these graphs shown in FIGS. 4 and 5 are:
(i) the appearance of O'—SiAlON by 1250° C.,
(ii) the disappearance of quartz by 1350° C., without the appearance of cristobalite,
(iii) the appearance and disappearance of mullite and α-phase between 1050° and 1450° C., except in FIG. 6 where some mullite remained in the final product,
(iv) the appearance of β-phase at 1250°–1350° C.,
(v) the appearance of X-phase at 1350°–1450° C., and
(vi) the residual silicon in the final product when using raw kaolin (see Example 6).

The α-phase probably represents the silicon nitride surface coating which forms on the silicon grains early in the nitridation reaction and is associated with the weight gain at 1200°–1250° C. (see Example 6). Alpha-silicon nitride is the expected product from this surface reaction. This α-phase disappears at higher temperatures and is probably reabsorbed into the melting silicon and reformed as β-phase, X-phase and O-SiAlON.

In the sample containing raw kaolin, where the 1200°–1250° C. weight gain is suppressed, less α-phase was expected, and was observed, but the difference is not great.

Example 8

Samples were fired at different rates to examine the effect of the heating rate on the reaction chemistry.

Figure 7:
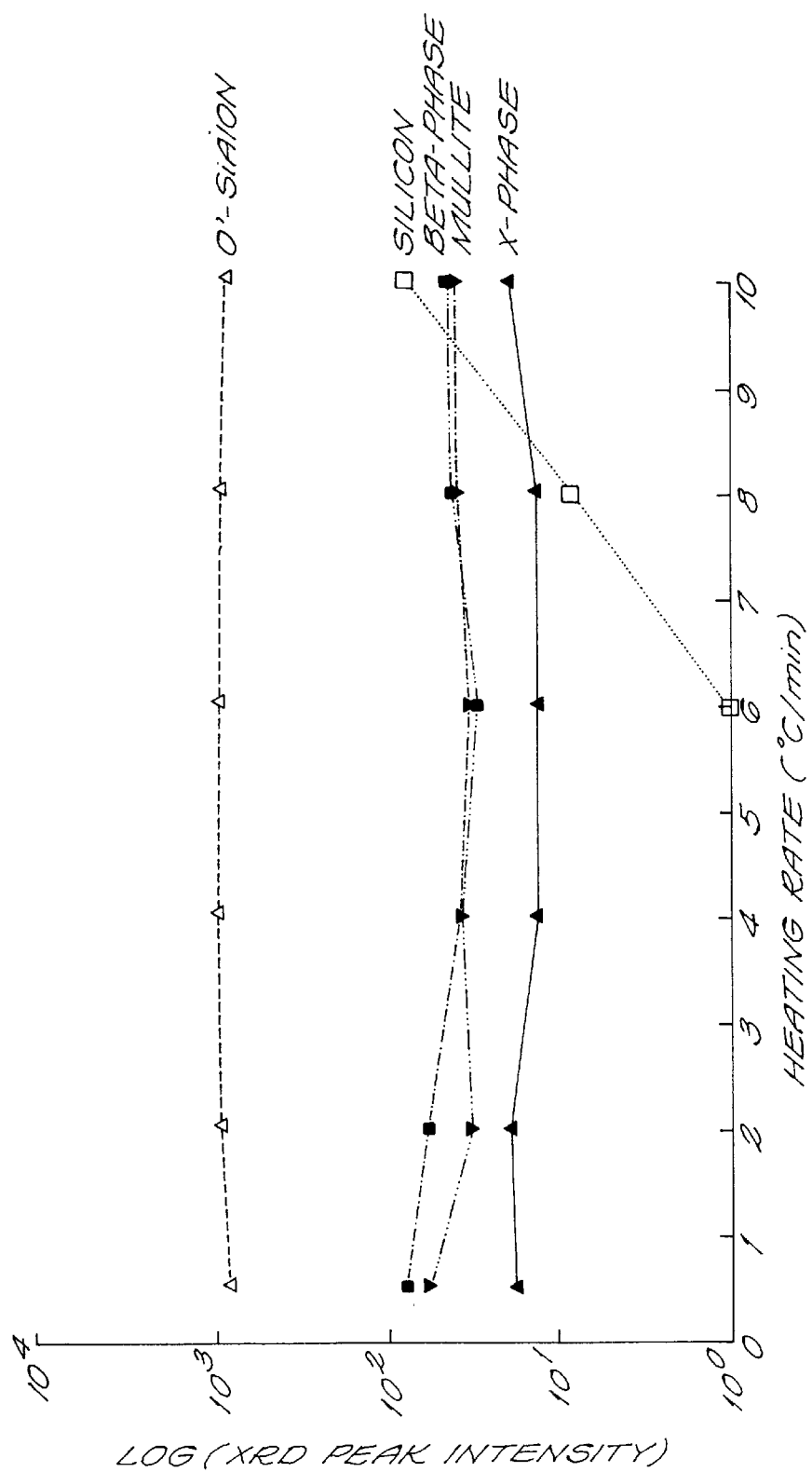
FIG. 7 shows XRD peak intensity v heating rate of the products of the O'—SiAlON reaction in Example 8.

The O'—SiAlON reaction mixture containing dehydroxylated kaolin as used in Examples 6 and 7 was lightly pressed (8 MPa) to form discs (1 g, 10 mm diam), and heated under "oxygen-free" nitrogen at 0.5, 2, 4, 6, 8 and 10° C.min$^{-1}$, to 1450° C. for 2 h in a Mettler Thermobalance. The resulting mass curves are plotted in FIG. 6, and XRD analyses of the products are shown in FIG. 7.

As the heating rate increases towards 5° C.min$^{-1}$, the relative amounts of mullite, β-phase and X-phase impurities in the products decline, and then begin to increase again at higher heating rates. At heating rates greater than 6° C.min$^-$1, nodules of residual silicon begin to appear in the product, and this can again be associated with the suppression of the surface nitridation reaction. The overall reaction proceeds so rapidly that this surface reaction does not have a chance to occur. These results suggests that the ideal heating rate is ca 5° C.min$^{-1}$.

Example 9
Effect of SiC on the Nitridation Reaction

The O'—SiAlON reaction mixture containing raw kaolin (as used in Example 6 and 7), was blended with 0%, 50% and 80% silicon carbide (H C Starck, A20, 0.5 μm) in a mortar and pestle, and the resulting mixtures were heated at 2° C.min$^{-1}$ to 1450° C. for 2 h under "oxygen-free" nitrogen in a Mettler Thermobalance. The resulting mass curves are given in FIG. 8, and the results of XRD analyses of the products are given in FIG. 9a.

Figure 8:
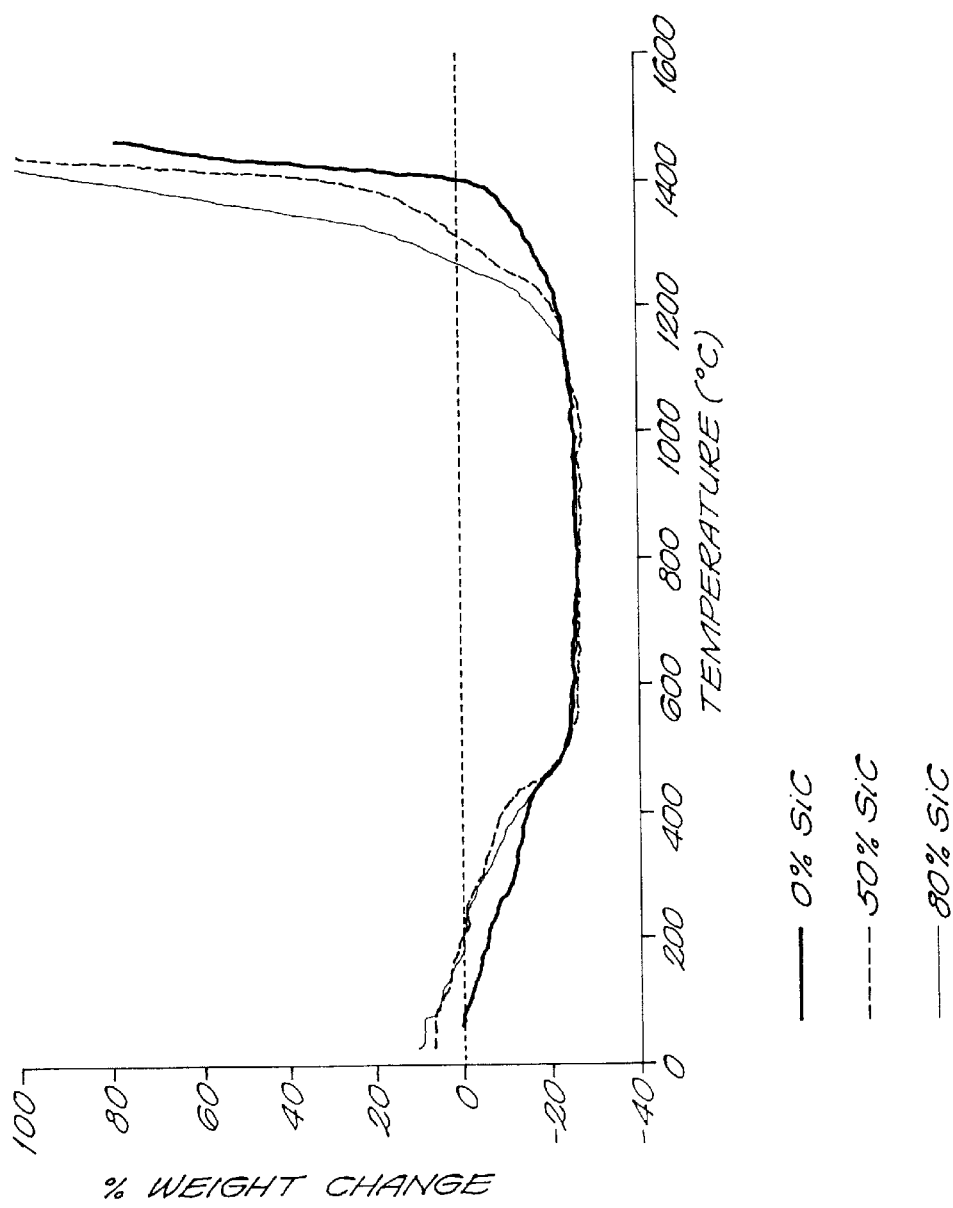
FIG. 8 shows the effect of increasing the SiC content in the production of SiC/O'—SiAlON composites produced in Example 9.
Figure 9B:
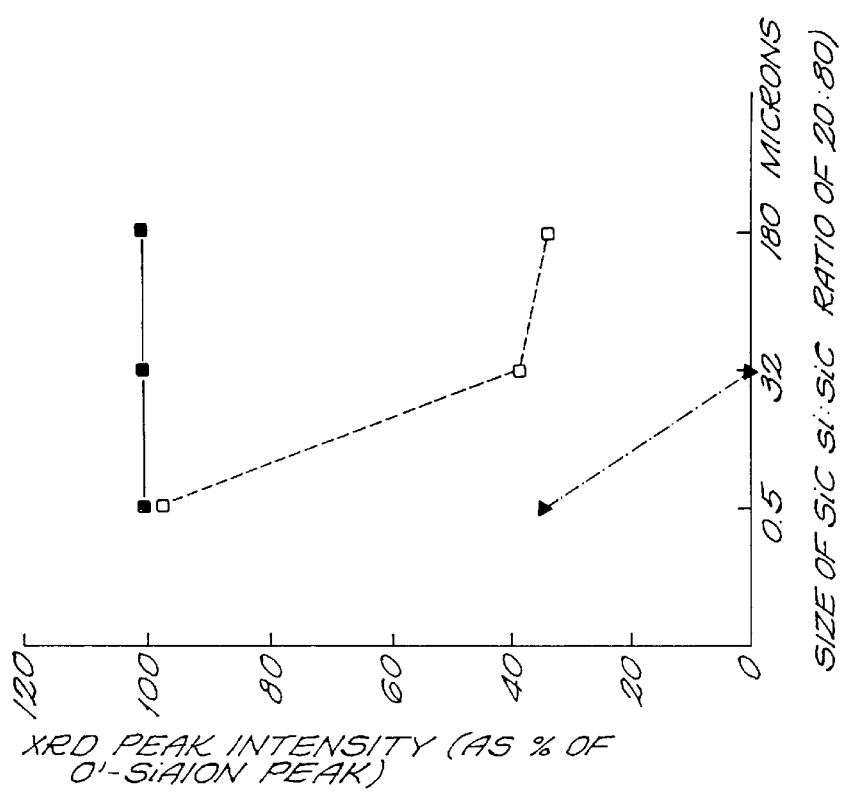
FIGS. 9(a) and (b) show XRD analyses of the products of the reactions in FIG. 8.
Figure 9A:
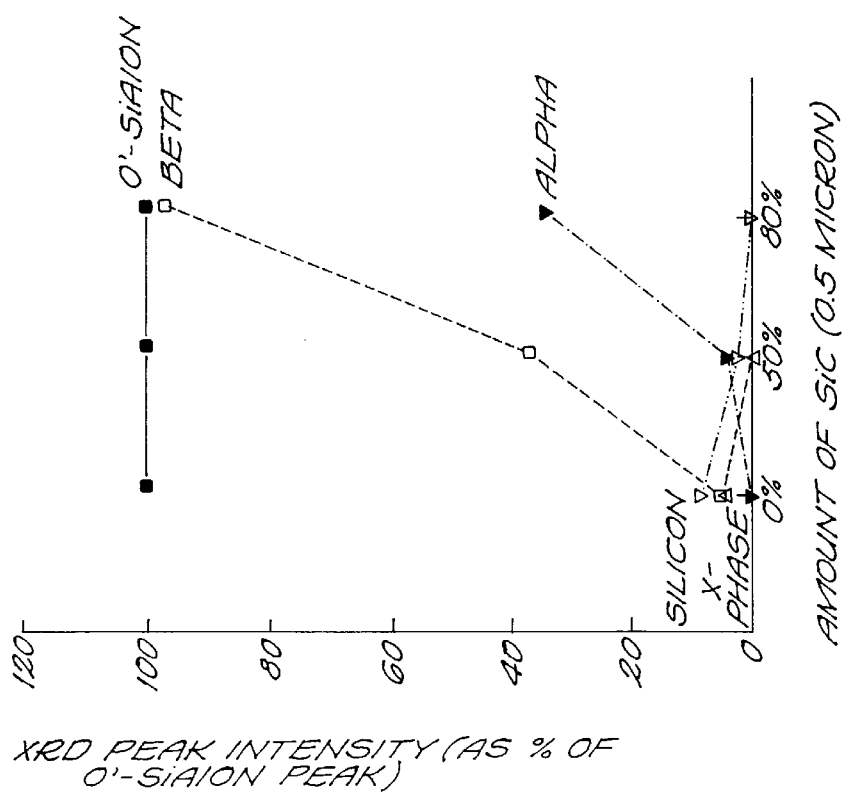

As the proportion of SiC in the mixture increases, the amount of residual silicon in the product decreases (FIG. 9a), and the weight gain at ca 1200° C. associated with surface nitridation increases (FIG. 8). If a reaction between the water of dehydroxylation and the silicon is preventing the surface nitridation of the silicon, then the presence of SiC may be acting to dilute the mixture and lower the water vapour pressure, or it may itself be reacting with the water vapour. The addition of alumina in place of SiC had a similar effect, suggesting that it is simply a dilution effect.

As the proportion of SiC in the mixture increases, the proportions of α-phase and β-phase impurities in the products also increase significantly. This implies that the SiC is actively participating in the reaction, and therefore the effect should decline with coarser grades of SiC. To confirm this, the O'—SiAlON reaction mixture containing raw kaolin was blended with different sizes of silicon carbide: 0.5 μm (H C Starck A20), 32 μm (Navarro C5 80 grit) and 180 μm (Navarro C5 400 grit); and fired as above. The results of the XRD analyses of the products are given in FIG. 9b.

As expected, as the size of the SiC increases it becomes less reactive and the proportion of β-phase formed in the product decreases.

Note that small samples fired in a Mettler Thermobalance experience very fresh gas and this tends to enhance the amounts of impurities such as β-phase and mullite in the products. This is a size effect, and in production scale furnaces it is negated by the sheer bulk of sample.

Example 10

This example illustrates the range over which the proportions of clay, silica and silicon can be varied, while still producing predominantly O'—SiAlON as the product.

Figure 10B:
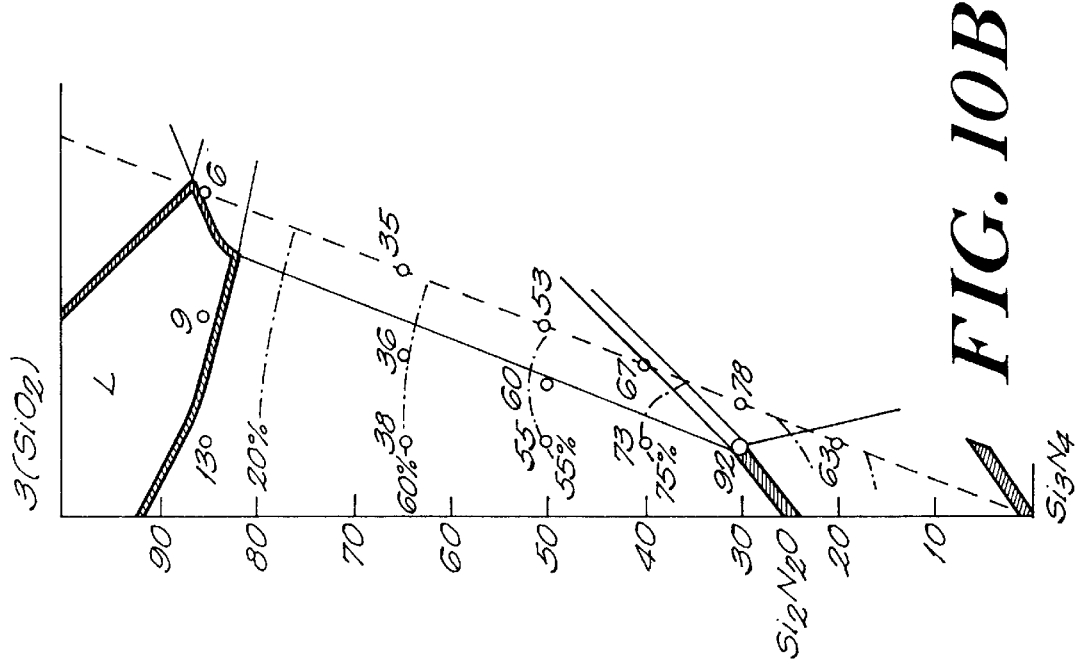
FIGS. 10 (a) (b) and (c) show behaviour diagrams for the SiAlON family of compounds.

At temperatures below 1600° C., O'—SiAlON is stable over the following composition range: $Si_{2-x}Al_xO_{1+x}N_{2-x}$ where $0<x\leq 0.2$. This range of compositions is represented in the SiAlON behaviour diagram (FIG. 10).

Figure 10A:
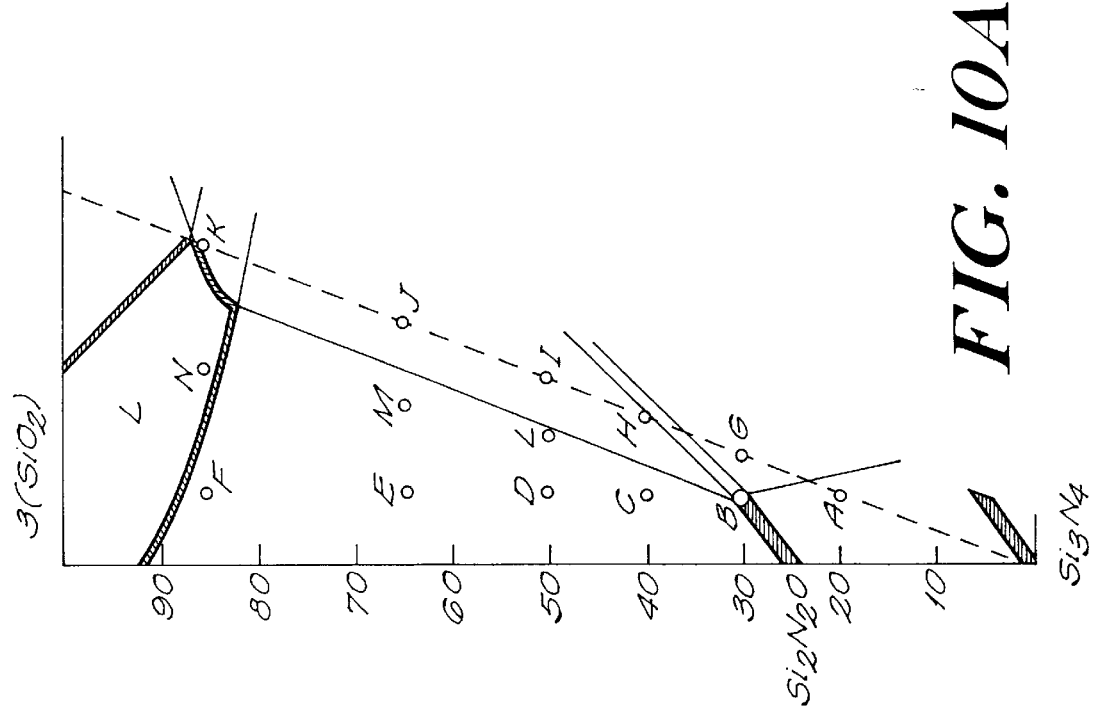
Figure 10C:
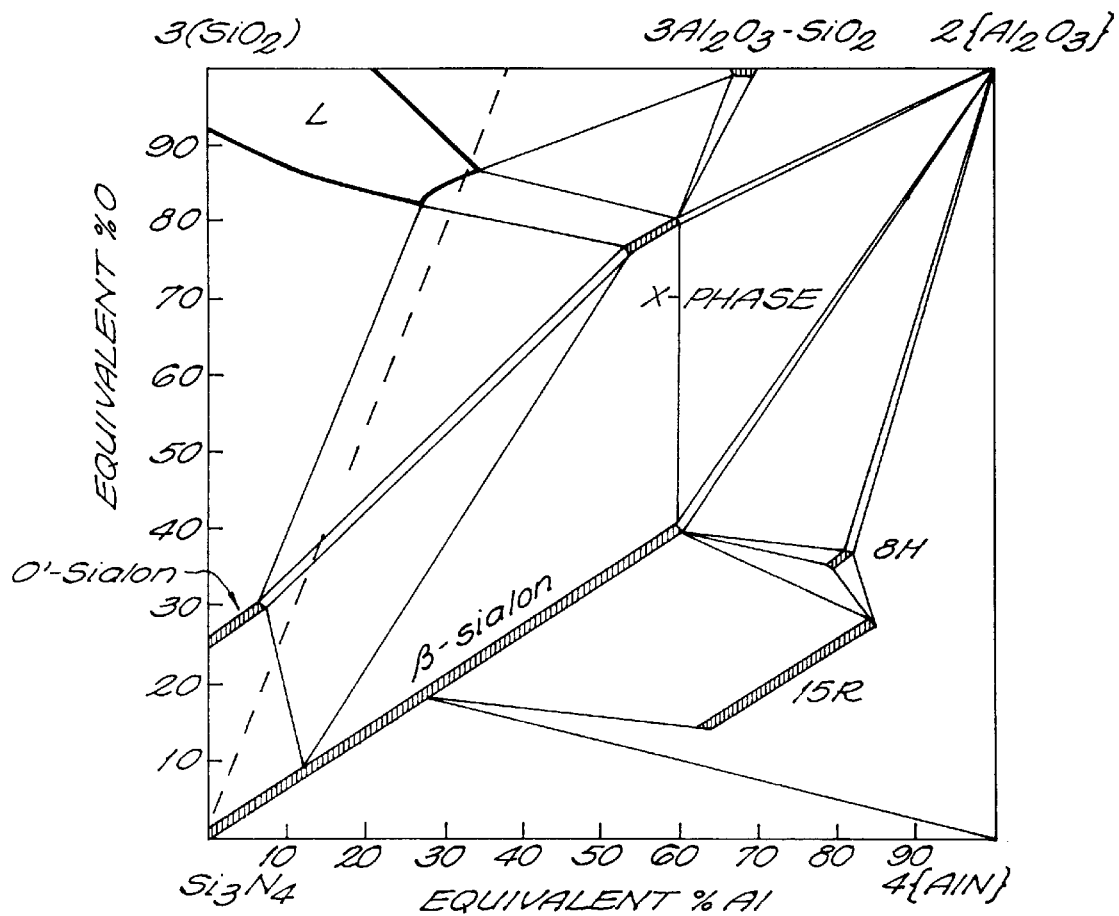

The behaviour diagram in FIG. 10 has been constructed by reacting 3 or 4 component mixtures of $SiO_2$, $Si_3N_4$, $Al_2O_3$ and AlN at 1700° C. In the case of the present invention a different process is used and the firing temperature is lower, so the behaviour diagram may not apply.

Mixtures containing NZCC halloysite clay, Permascand 4D silicon and Commercial Minerals superfine quartz powder in varying proportions, were hand blended in a mortar and pestle under ethanol, and the solvent was removed by evaporation. The theoretical fired compositions of these mixtures are plotted on the SiAlON behaviour diagram (FIG. 10a). Note that the process of the present invention is restricted to the triangular section of the diagram defined by the raw materials; $SiO_2$, clay (in the case of this example, NZCC Halloysite) and Si (equating to $Si_3N_4$). The dried powders were lightly pressed (8 MPa) to form pellets (10 mm diam., 2 g), and heated under "oxygen free" nitrogen at 2° C.min$^{-1}$ to 1450° C. for 2 h in a tube furnace. The products were analyzed by X-ray Powder Diffraction (XRD), and the amount of O'—SiAlON in each of the products was estimated from XRD peak heights. The results are presented in FIG. 11 (sample codes refer to compositions indicated in FIG. 10a).

All of the samples were completely reacted in that no unreacted silicon remained in any of the products. The products formed from each mix, and their relative proportions, were largely consistent with what was expected from the behaviour diagram. The estimated percentage yields of O'—SiAlON are plotted in FIG. 10b. From this plot, the target composition needs to be within the range: $Si_{(1.7-1.8)}Al_{(0-0.333)}O_{(0.78-1.56)}N_{(15.6-20.8)}$ to obtain $\geq 80\%$ O'—SiAlON. The exact amounts of silicon, silica and clay needed to achieve this will depend upon the exact composition of the particular clay being used.

Example 11

The effects of various additives on the formation of O'—SiAlON were investigated to assess their potential as catalysts or sintering aids, and to examine the effect of common clay impurities such as Ca and Na.

Figure 13:
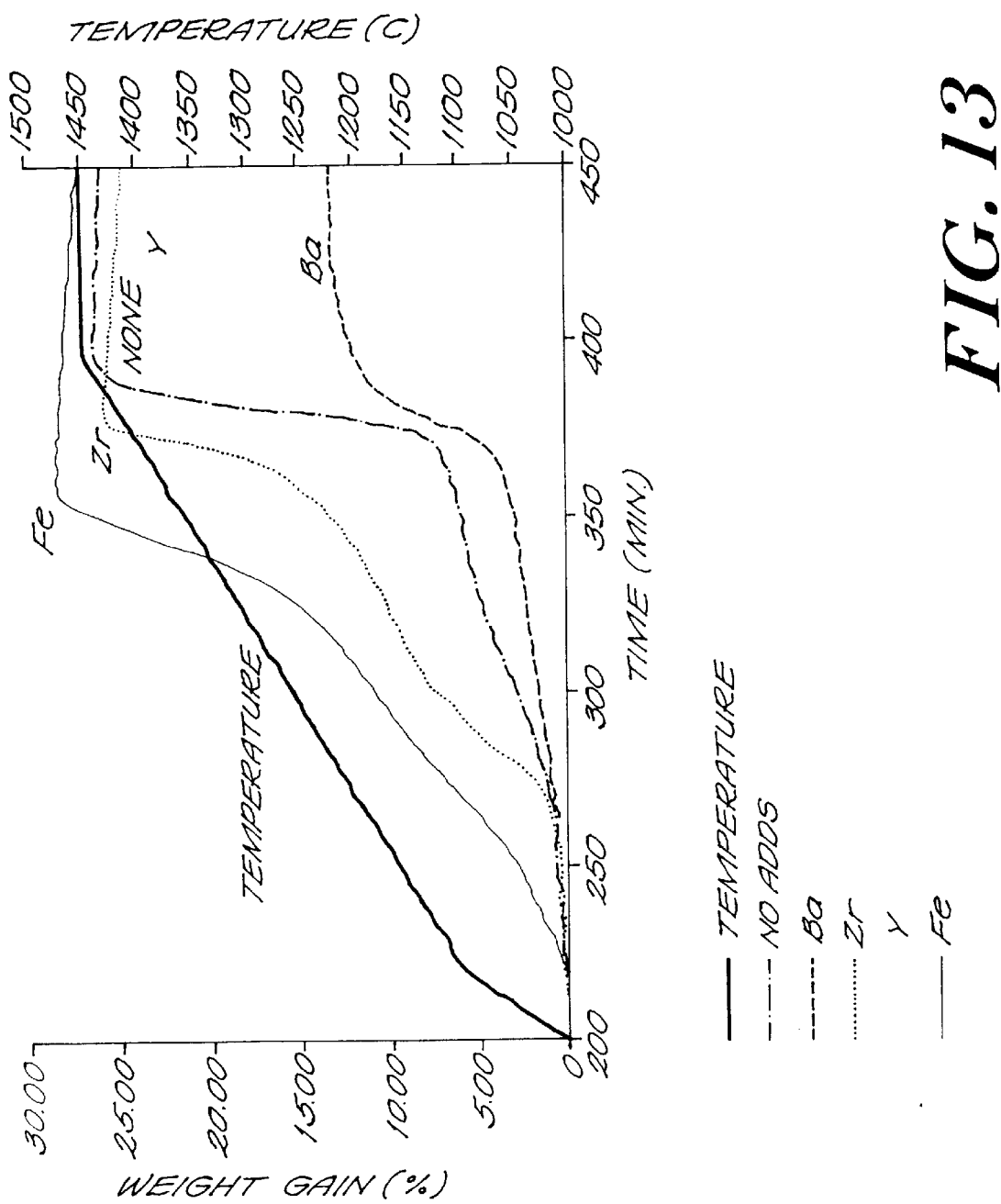

A standard O'—SiAlON reaction mixture was prepared by ball-milling Permascand 4D Si, dehydrated NZCC halloysite clay and superfine quartz powder for 20 h under hexane with $Si_3N_4$ balls as described in Example 6. Samples of this mix (5.8 g) were remilled for 4 hours with BaO, CaO, $ZrO_2$, $Na_2CO_3$, $Fe_3O_4$ and $Y_2O_3$ at a level of 1.5 mol % of cation by theoretical weight of O'—SiAlON product. The dried powders were lightly pressed (8 MPa) to form pellets (1 g, 10 mm diam.), and heated under "oxygen free" nitrogen at 2° C.min$^{-1}$ to 1450° C. for 2 h in a Mettler thermobalance. The products were analyzed by XRD. The results are presented in FIG. 12, and mass curves are plotted in FIG. 13. Of the additives that were tried, only $Fe_3O_4$ and $ZrO_2$ promoted reaction. $Na_2CO_3$, BaO and CaO appeared to hinder the O'—SiAlON reaction, and large amounts of unreacted silicon remained in the products. One possibility is that the Ba, Ca and Na are fluxing the clay at such a low temperature that the pellet sinters before it can nitride. Nitrogen is then unable to get to the silicon. In support of this is the observation that these three pellets showed the greatest shrinkage during firing (see FIG. 12).

Figure 14A:
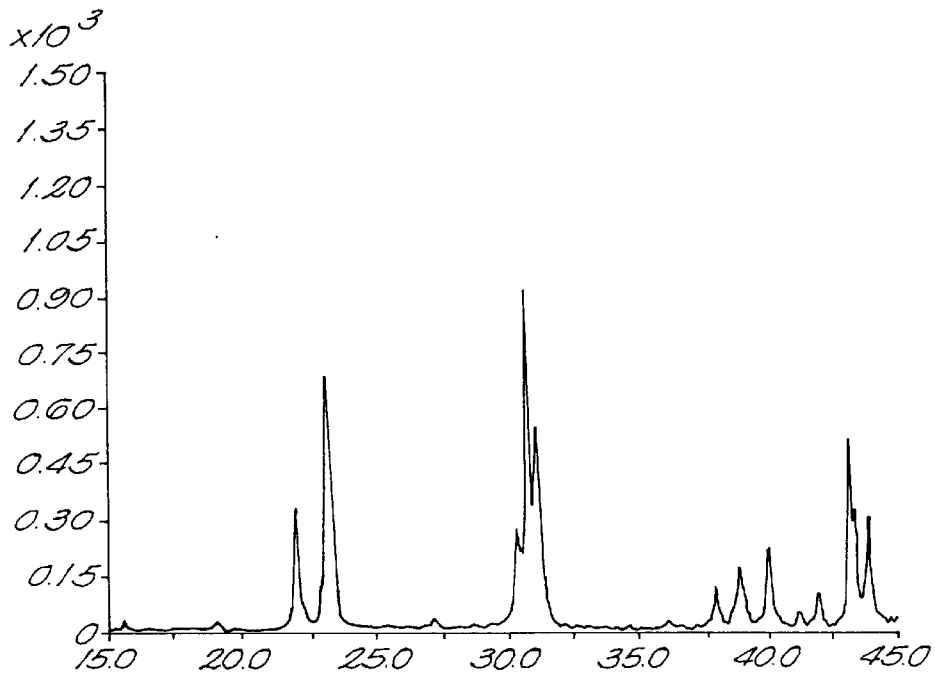
FIG. 14 shows the XRD analysis for (a) O'—SiAlON fired with no $Y_2O_3$ and (b) O'—SiAlON fired with 2 wt % $Y_2O_3$.
Figure 14B:
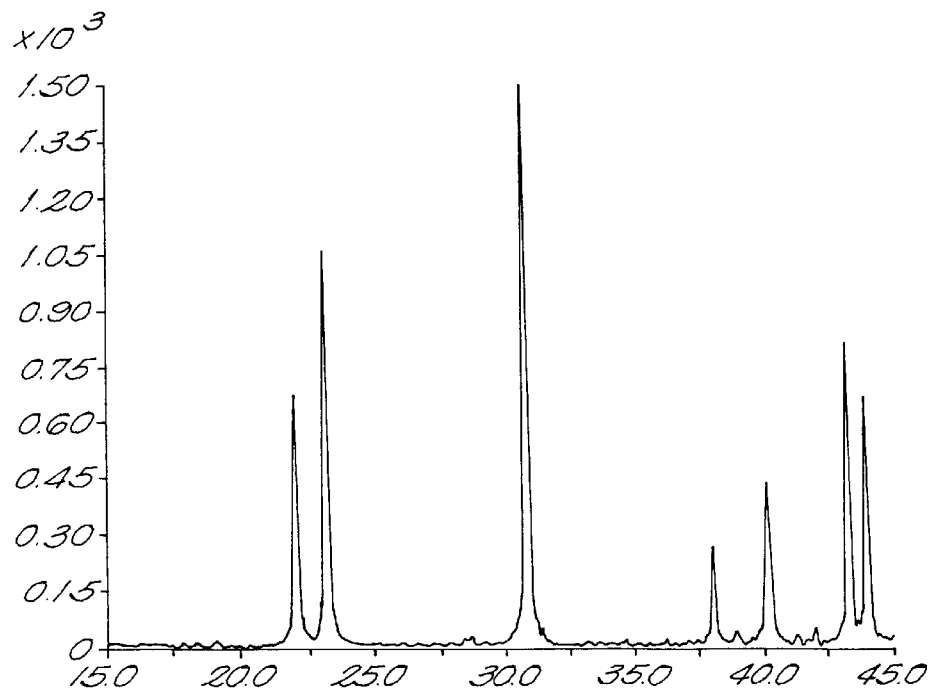

$Y_2O_3$ appeared to retard the reaction slightly, but the XRD analysis indicated that it gave a more pure O'—SiAlON product (FIG. 14). Significant shrinkage during firing (14.4%) was also observed. It may therefore be valuable as a sintering aid for the O'—SiAlON reaction.

Example 12

O'—SiAlON composites were investigated by preparing and firing mixtures of the raw O'—SiAlON mix with various ceramic materials. These were combined in a ratio to give a 50:50 mix of O'—SiAlON and the second ceramic component. Fine powders were used to highlight possible interference of the second ceramic component in the O'—SiAlON reaction.

A standard O'—SiAlON reaction mixture was prepared by ball-milling Permascand 4D Si, halloysite clay and superfine quartz powder for 20 h under hexane with $Si_3N_4$ balls as described in Example 6, Samples of this mix were hand-blended with alumina (Buehler 0.3 μm γ-$Al_2O_3$), silicon nitride (H C Starck LC10), sialon (Bensalon S-011), zircon (opaciline) and zirconia (Tosoh TZ-0) under ethanol using a mortar and pestle. The dried powders were lightly pressed (8 MPa) to form discs (1 g, 10 mm diam.), and heated under nitrogen at 2° $C.min^{-1}$ to 1450° C. for 2 h in a Mettler Thermobalance.

The products were analyzed by XRD. The results are presented in FIG. 15 and mass curves are plotted in FIG. 16.

Figure 16:
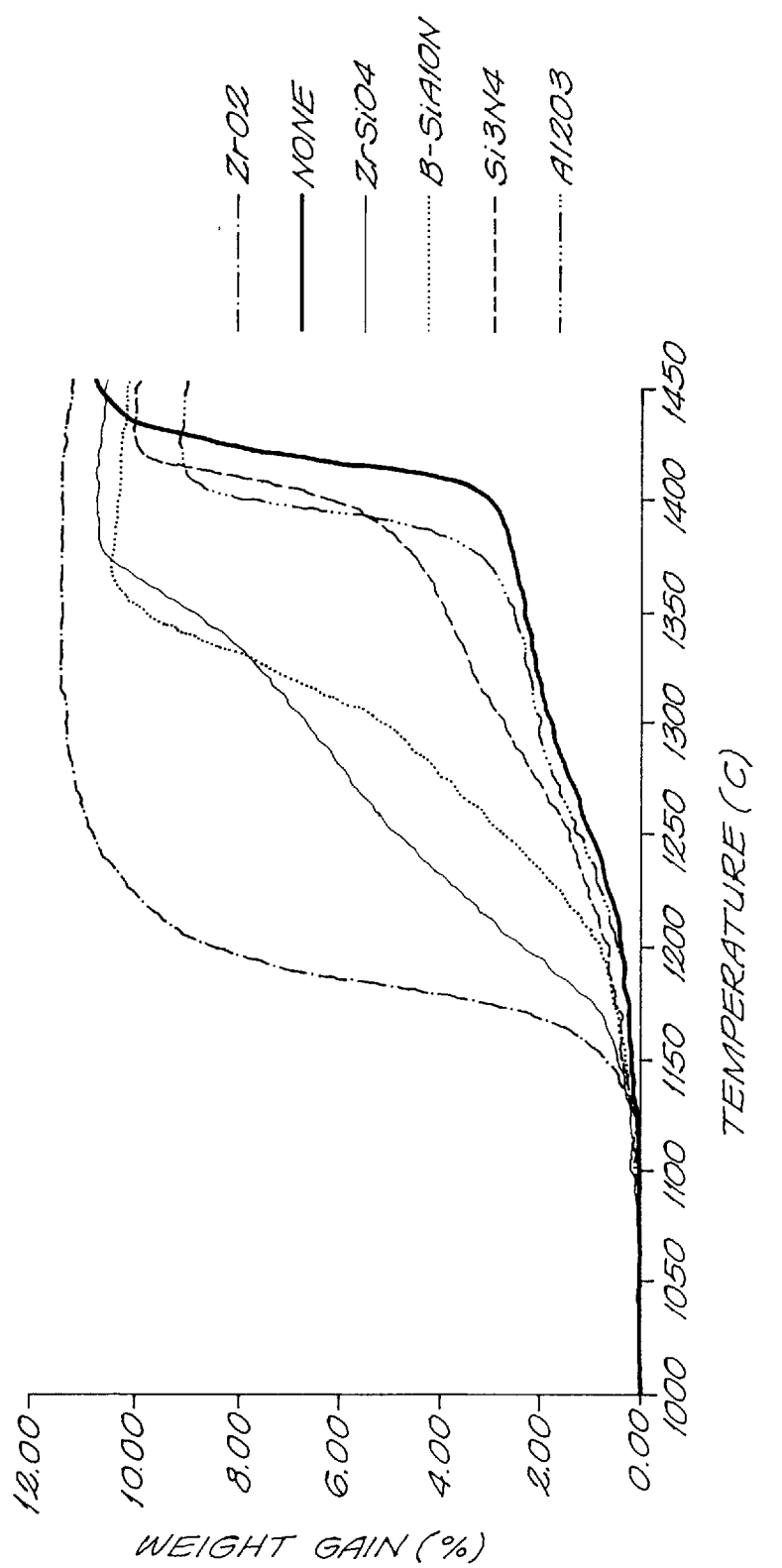

In each case, the reaction yielded predominantly O'—SiAlON, ie none of the ceramic materials that were tried significantly hindered the formation of O'—SiAlON. The possible exception was $Al_2O_3$ which increased the amount of β-phase in the product. This may not occur with coarser $Al_2O_3$. In contrast, the β-SiAlON, $ZrO_2$ and $ZrSiO_4$ greatly accelerated the reaction to form O'—SiAlON (FIG. 16).

Example 13

This example demonstrates the fabrication of a composite ceramic product (SiC/O'—SiAlON), formed by extrusion.

To a mixture of:

50% Navarro 220-grit silicon carbide (SiC);

16% New Zealand China Clays Premium Grade Halloysite Clay;

2% Bentonite SM23 supplied by Commercial Minerals;

24% Simcoa Silicon Dust (mean size=3.5 μm); and

8% Pemco—325 mesh Fused Silica ($SiO_2$);

was added sufficient pressing soap (a mixture of water, kerosine, oleic acid and TEA as is known in the art) to give a consistency suitable for extrusion.

This mix was used to extrude 5 cylindrical rods (25 mm diam×ca 200 mm, ca 275 g dry weight). These rods were heated under flowing "oxygen free" nitrogen (45 $l.min^{-1}$) to 1450° C. and held at that temperature for 6 hours.

Analysis of the products by X-ray powder diffraction (XRD) revealed primarily SiC and O'—SiAlON with a trace of X-phase SiAlON. The bulk density and open porosity of the fired rods were measured by evacuation and water saturation. The modulus of rupture of the 5 rods was measured by the 3-point method.

| | | |
|---|---|---|
| average bulk density | = | 2.28 $g.cm^3$ (76% of theoretical) |
| average open porosity | = | 23.3% |
| modulus of rupture | = | 71 MPa |

Example 14

This is an example of O'—SiAlON reaction bonded body, which is sintered in a second firing to form a fully dense body.

A standard O'—SiAlON reaction mixture was prepared by ball-milling Permascand 4D Si, dehydroxylated BDH kaolin clay and superfine quartz powder, as described in Example 6. A sample of the dried powder was formed into a bar (62.6×8.8×7.0 mm, 4.98 g) by uniaxial pressing at 25 MPa. The bar was fired in a graphite resistance furnace on a bed of SiAlON granules under a flowing "oxygen free" nitrogen atmosphere at 2° $C.min^{-1}$ to 1450° C. and held at that temperature for 2 hours.

During reaction bonding, the bar increased in mass by ca 22%, and a linear shrinkage of 7.7% was measured. The bulk density and open porosity of the sintered bar was measured by evacuation and water saturation:

| | | |
|---|---|---|
| bulk density | = | 2.11 $g.cm^{-3}$ (75% of theoretical) |
| open porosity | = | 24.8% |

The bar was then sintered by firing in a $Si_3N_4$ powder bed under "oxygen free" nitrogen in a graphite resistance furnace to 1700° C. for 1 hour.

During sintering, the bar decreased in mass by ca 13%, and a linear shrinkage of 8.7% was measured. An analysis of the products by X-ray powder diffraction (XRD) revealed O'—SiAlON with faint traces of mullite and X-phase SiAlON. The bulk density and open porosity of the sintered bar was measured by evacuation and water saturation. Thermal expansion was measured using a Harrop Laboratories dilatometer. The modulus of rupture was measured by 4-point method.

| | |
|---|---|
| bulk density | = 2.80 g · $cm^{-3}$ (100% of theoretical) |
| open porosity | = 0.0% |
| thermal expansion | = 2.2 × $10^{-6}$ · $°C.^{-1}$ from 25 to 100° C. |
| | = 3.3 × $10^{-6}$ · $°C.^{-1}$ from 25 to 1000° C. |
| modulus of rupture | = 375 MPa |

Example 15

This is an example of fully dense O'—SiAlON body prepared by sintering preformed O'—SiAlON powder.

A standard O'—SiAlON reaction mixture was prepared by ball-milling Permascand 4D Si, dehydroxylated BDH kaolin clay and superfine quartz powder, as described in Example 6. The dried powder (23.42 g) was blended with water (14.35 g, 38%), extruded through an 8 mm diameter hole, dried, and broken into pellets ca 10–25 mm in length. A 10 g sample of these pellets was fired in a 50 mm diameter tube furnace on a bed of SiAlON granules under flowing "oxygen free" nitrogen (ca 150 $ml.min^{-1}$) at 2° $C.min^{-1}$ to 1450° C. and held at that temperature for 2 hours. A weight gain of 23.9% was observed, and the product was found to be primarily O'—SiAlON with traces of mullite and β-phase. The fired pellets were crushed to 1.5 mm in a WC percussion mortar, and ball-milled in a 1 liter HDPE bottle for 20 h under ethanol (170 g) with $Si_3N_4$ balls (950 g, 10 mm diam). Oleic acid (5% by weight of O'—SiAlON) was added and the mixture milled for a further 15 min. The milled slurry was filtered through a 10 μm filter cloth, and the solvent was removed from the filtrate by rotary evaporation. The dried powder was brushed through a 295 μm sieve to granulate it. A sample of the powder was formed into a bar (58.5×8.2×6.0 mm, 4.68 g) by uniaxial pressing at 25 MPa, followed by cold isostatic pressing at 350 MPa. The bar was heated at 0.5° C. $min^{-1}$ to 400° C. for 30 min under nitrogen atmosphere to remove the oleic acid, and sintered in a $Si_3N_4$ powder bed under "oxygen free" nitrogen in a graphite resistance furnace to 1700° C. for 1 hour.

During sintering, the bar decreased in mass by ca 11%, and a linear shrinkage of 18% was measured. O'—SiAlON was the only phase detectable by X-ray powder diffraction (XRD). The bulk density and open porosity of the sintered bar was measured by evacuation and water saturation. The modulus of rupture was measured by the 4 point method.

| | |
|---|---|
| bulk density | = 2.79 g · cm$^{-3}$ (100% of theoretical) |
| open porosity | = 0.0% |
| modulus of rupture | = 424 MPa |

Example 16

This example illustrates the variety of clay minerals that can be used to prepare O'SiAlON.

Nine clay mineral samples were selected and analysed for major oxides by X-Ray fluorescence (XRF) (FIG. 17). These minerals were calcined at 1000° C. for 1 hour, and hand-blended in a mortar and pestle under ethanol, with appropriate amounts of Permascand 4D Si and Commercial Minerals superfine quartz powder to give O'—SiAlON (Si$_{2-x}$Al$_x$O$_{1+x}$N$_{2-x}$) with x=0.2 where possible. In some cases, the Al$_2$O$_3$:SiO$_2$ ratio in the mineral was too low to form x=0.2 O'—SiAlON. The dried powders were lightly pressed (8 MPa) to form discs (0.5 g, 10 mm diam), and fired in a tube furnace at 2° C. min$^{-1}$ to 1450° C. for 2 h on a bed of SiAlON granules under a flowing atmosphere of "oxygen free" nitrogen (30 ml.min$^{-1}$g$^{-1}$). The weight change was measured, and the products were analysed by X-ray powder diffraction (XRD) (see FIG. 18).

Example 17

This example illustrates the range of firing temperatures which can be used to form O'—SiAlON.

Figure 19:
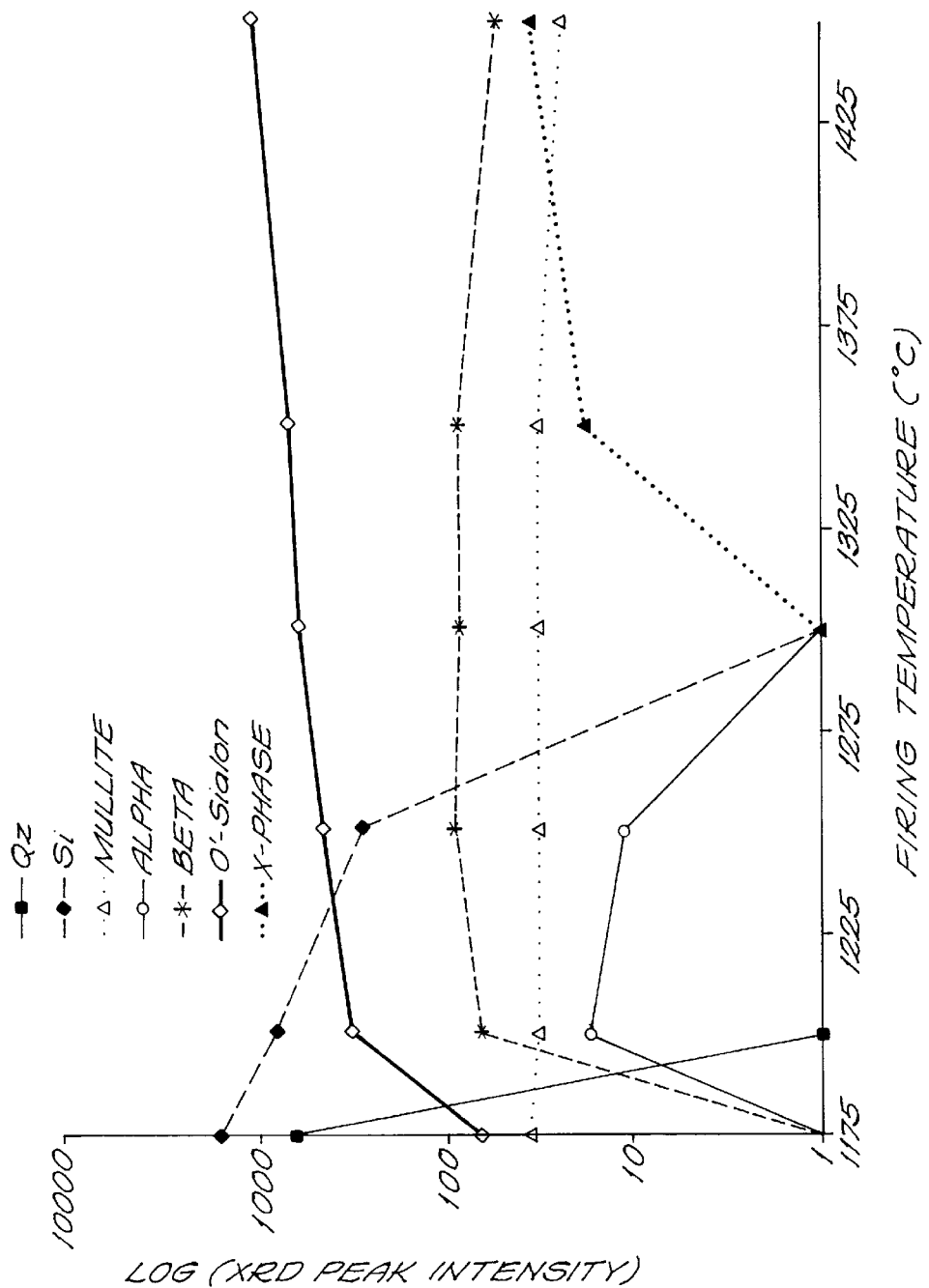
FIG. 19 shows the effect of firing temperature on the production of O'—SiAlON from Example 17.

The O'—SiAlON reaction mixture containing dehydroxylated kaolin as used in Examples 6 and 7 was lightly pressured (8 MPa) to form discs (0.5 g 10 mm diam.). Discs were heated on a bed of SiAlON granules, under a flowing "oxygen free" nitrogen atmosphere (50 ml.min$^{-1}$.g$^{-1}$) at a heating rate of 2° C.min$^{-1}$ to the following temperatures: 1175° C., 1200° C., 1250° C., 1300° C., 1350° C. and 1450° C., and held at those temperatures for 8 hours. The results from XRD analyses of the products are shown in FIG. 19.

In general, discs fired at higher temperatures gave more pure O'SiAlON. Discs fired for 8 hours at temperatures less than 1300° C. did not react to completion; unreacted silicon remained in the products. However the reaction may go to completion at temperatures lower than 1300° C. if the furnace is held at temperature for periods longer than 8 hours.

The foregoing describes preferred forms of the invention and it is to be understood that the scope of the invention is not to be limited to the specific forms described. Modifications and variations as will be obvious to a person skilled in the art may be made to the forms of the invention as described without departing from the spirit or scope of the invention as defined in the attached claims.

We claim:

1. A process for the production of O'—SiAlON from silicon metal, nitrogen, and clay, the process comprising heating a component mixture comprising the silicon metal and the clay in a flowing nitrogen atmosphere to a temperature sufficient to react the components to form O'—SiAlON and wherein the clay participates in the reaction as a source of aluminum and silicon.

2. The process according to claim 1 wherein the clay is the sole source of aluminium.

3. The process according to claim 1 comprising dehydroxylating the clay and mixing the dehydroxylated clay with the silicon metal and heating the component mixture under a flowing nitrogen atmosphere to a temperature sufficient to react the mixture to form O'—SiAlON.

4. The process according to claim 1 further comprising the addition of silica.

5. The process according to claim 1 wherein the clay is a hydrated layer aluminosilicate mineral.

6. The process according to claim 1 wherein the clay is a kaolin, montmorillonite, pyrophyllite, bentonite or halloysite clay.

7. The process according to claim 1 wherein the clay is dehydroxylated by precalcining and the dehydroxylated clay is mixed with the silicon metal and heated in the flowing nitrogen atmosphere.

8. The process according to claim 1 wherein the clay is dehydroxylated by heating the clay to a temperature between about 500° C. and about 800° C. and the dehydroxylated clay is mixed with the silicon metal and heated in the flowing nitrogen atmosphere.

9. The process according to claim 1 wherein the component mixture is present as fine powders.

10. The process according to claim 1 wherein the clay is present in an amount of between about 5% and about 60% by weight.

11. The process according to claim 1 wherein the clay is present in an amount of between about 20% and about 60% by weight.

12. The process according to claim 1, the component mixture including by weight, about 20% to about 50% clay, 0% to about 25% silica and about 40% to about 60% silicon metal.

13. The process according to claim 1, the component mixture including about 30% to about 40% clay, about 10% to about 20% silica, and about 40% to about 55% silicon metal.

14. The process according to claim 1 wherein the flowing nitrogen atmosphere comprises ≦0.5% oxygen and ≦0.5% water vapor.

15. The process according to claim 1 wherein the flowing nitrogen atmosphere comprises ≦10 ppm O$_2$ and ≦25 ppm water vapor.

16. The process according to claim 1 wherein the mixture is heated to between about 1100° C. and about 1900° C.

17. The process according to claim 1 wherein the mixture is heated at a rate between about 0.2° C. and about 10° C. per minute.

18. The process according to claim 17 wherein the heating rate is between about 2° C. and about 5° C. per minute.

19. The process according to claim 1 wherein the component mixture is held at the temperature for between about 4 and about 60 hours.

20. The process according to claim 1 wherein additive compounds are included to enhance the reaction and/or to promote sintering.

21. The process according to claim 20 wherein additive compounds selected from Y$_2$O$_3$, Fe$_3$O$_4$, ZrO$_2$, ZrSiO$_4$, MgO and β-SiAlON are included to enhance the reaction and/or to promote sintering.

22. The process according to claim 1 further comprising the addition of a ceramic material to produce a composite ceramic including O'—SiAlON.

23. The process according to claim 1 wherein ceramic material selected from silicon carbide (SiC), alumina (Al$_2$O$_3$), silicon nitride (Si$_3$N$_4$), SiAlON, zirconia (ZrO$_2$), zircon (ZrSiO$_4$) and silica (SiO$_2$) is added to produce a composite ceramic including O'—SiAlON.

24. The process according to claim 1 wherein a ceramic material coarser than the other mixture components which react to form the O'—SiAlON is added to produce a composite ceramic including O'—SiAlON.

25. The process according to claim 1 wherein up to about 75% by weight of the mixture of a ceramic material is added to produce a composite ceramic including O'—SiAlON.

26. The process according to claim 1 wherein additional ceramic material is present in an amount of between about 40% and about 70% by weight of the mixture.

27. A process for the production of O'—SiAlON from a component mixture comprising, by weight, 40%–60% silicon metal, 20%–45% clay, and 10%–25% silica, the process comprising the steps of:

(a) dehydroxylating the clay prior to inclusion in the component mixture;

(b) heating the component mixture at a rate of 1° C. to 6° C. per minute, to a temperature of between about 1300° C. to 1900° C. under a flowing nitrogen atmosphere having $\leq 0.5\%$ oxygen and $\leq 0.5\%$ water vapor;

(c) holding the temperature between 1300° C. and 1900° C. for up to 12 hours; and (d) recovering O'—SiAlON.

28. A process for the production of a composite ceramic material including O'—SiAlON from a mixture of components comprising a ceramic material, and an O'—SiAlON forming combination of silicon metal, clay and nitrogen wherein the process comprises heating the ceramic material, silicon metal and clay in a flowing nitrogen atmosphere to a temperature sufficient to form the O'—SiAlON composite ceramic and wherein the clay is a source of aluminum and silicon.

29. The process according to claim 28 wherein the O'—SiAlON forming combination further comprises silica.

30. The process according to claim 28 wherein the clay is the sole source of aluminium for the production of O'—SiAlON.

31. The process according to claim 29 wherein the ceramic material is selected from silicon carbide (SiC), alumina ($Al_2O_3$), silicon nitride ($Si_3N_4$), SiAlON, zirconia ($ZrO_2$), zircon ($ZrSiO_4$) and silica ($SiO_2$).

32. A process for the production of a composite ceramic including O'—SiAlON from a mixture of components comprising, by weight, up to 75% of a ceramic material and 2.5% or more of an O'—SiAlON forming mixture, wherein the O'—SiAlON forming mixture comprises, by weight, 40%–60% silicon metal, 20%–45% clay, and 10%–25% silica, the process comprising the steps of:

(a) heating the component mixture at a rate of between about 1° C. to 6° C. per minute, to a temperature of between substantially 1300° C. to 1900° C. under a flowing $N_2$ atmosphere having $\leq 0.5\%$ oxygen and $\leq 0.5\%$ water vapor;

(b) holding the temperature between 1300° C. and 1900° C. for up to 12 hours; and (c) recovering the composite ceramic.

* * * * *